US007124372B2

(12) United States Patent
Brin

(10) Patent No.: US 7,124,372 B2
(45) Date of Patent: Oct. 17, 2006

(54) INTERACTIVE COMMUNICATION BETWEEN A PLURALITY OF USERS

(76) Inventor: Glen David Brin, 801 Calle Santa Cruz, Encinitas, CA (US) 92024-9661

( * ) Notice: Subject to any disclaimer, the term of this patent is extended or adjusted under 35 U.S.C. 154(b) by 751 days.

(21) Appl. No.: 10/171,246

(22) Filed: Jun. 12, 2002

(65) Prior Publication Data

US 2003/0001890 A1   Jan. 2, 2003

Related U.S. Application Data

(60) Provisional application No. 60/298,148, filed on Jun. 13, 2001.

(51) Int. Cl.
*G06F 3/01* (2006.01)
*G06F 3/048* (2006.01)
*G06F 15/16* (2006.01)

(52) U.S. Cl. ............. 715/751; 715/758; 715/757; 715/759

(58) Field of Classification Search ........... 715/758, 715/757, 753, 759, 751, 837; 709/204, 205
See application file for complete search history.

(56) References Cited

U.S. PATENT DOCUMENTS

| 5,680,563 | A | 10/1997 | Edelman ............... 715/757 |
| 5,793,365 | A | 8/1998 | Tang et al. ............ 379/93.17 |
| 5,894,307 | A | 4/1999 | Ohno et al. ............ 715/757 |
| 5,923,737 | A | 7/1999 | Weishut et al. ........ 715/758 |
| 5,926,179 | A * | 7/1999 | Matsuda et al. ....... 715/759 X |
| 6,219,045 | B1 | 4/2001 | Leahy et al. ........... 715/757 |
| 6,396,509 | B1 * | 5/2002 | Cheng ................... 715/757 X |
| 6,476,830 | B1 * | 11/2002 | Farmer et al. ......... 715/758 X |
| 6,559,863 | B1 * | 5/2003 | Megiddo ................ 715/753 |
| 6,772,195 | B1 * | 8/2004 | Hatlelid et al. ........ 709/204 |
| 6,784,901 | B1 * | 8/2004 | Harvey et al. ......... 715/757 |
| 6,910,186 | B1 * | 6/2005 | Kim ...................... 715/758 X |
| 6,961,755 | B1 * | 11/2005 | Matsuda ............... 709/204 |
| 6,981,220 | B1 * | 12/2005 | Matsuda ............... 715/757 X |
| 2005/0216853 | A1 * | 9/2005 | Matsuda ............... 715/764 |

OTHER PUBLICATIONS

"Conferencing Metaphor", IBM Technical Disclosure Bulletin, vol. 36, No. 2, Feb. 1, 1993, pp. 63-66.*
"Conversaton Map Version 0.01, An Interface for Very Large-Scale Conversations", Warren Sack, Social Technologies Group, SIMS, UC Berkeley.

* cited by examiner

*Primary Examiner*—Raymond J. Bayerl
(74) *Attorney, Agent, or Firm*—Jaquez & Associates; John F. Land, Esq.; Martin J. Jaquez, Esq.

(57) ABSTRACT

A system, method, and computer program for interactive communication among a plurality of users. The invention, called Holocene Conversation Mode ("HCM"), takes advantage of the observation that human beings have developed or utilize a number of real-world characteristics to participate in, perceive, control, and glean subtleties from conversations. These characteristics include proximity and orientation of a listener to other speakers, memory ageing, emphasis by a speaker, relative importance of a speaker to a listener, reputation of a speaker, and the unique human ability to "filter" words of special interest to a listener from overheard conversations. HCM includes a suite of techniques, including spatial and content compression as a function of some of such characteristics, that can be implemented in various combinations in computer software. HCM supports other forms of user interaction, such as allowing a user to give or send an object to another user, or to allow a user to take an object from another user. In addition, HCM supports "kiosks", in which users can interact with non-human resources in the context of a host-defined environment.

126 Claims, 20 Drawing Sheets

| ID | Direction of Attention | Position | Key Words | Importance Terms | Topics | External Reputation | Internal Reputation | Session Timer |
|---|---|---|---|---|---|---|---|---|
| Sam | 30 | 25, 100 | "Java"; "SETI"; "San Diego" | ID: {"Asimov", 1}; TOPIC: {"science fiction", 2} | "Global Warming"; "Knitting" | 3 | 1 | 00410 |

FIG. 4A

| Tag | Text | Italics | Underline | Bold | Time Stamp |
|---|---|---|---|---|---|
| T1 | Has anyone read the *new* book on SETI? | On | Off | On | 00365 |
| T2 | I don't recall the author. | Off | Off | Off | 00378 |

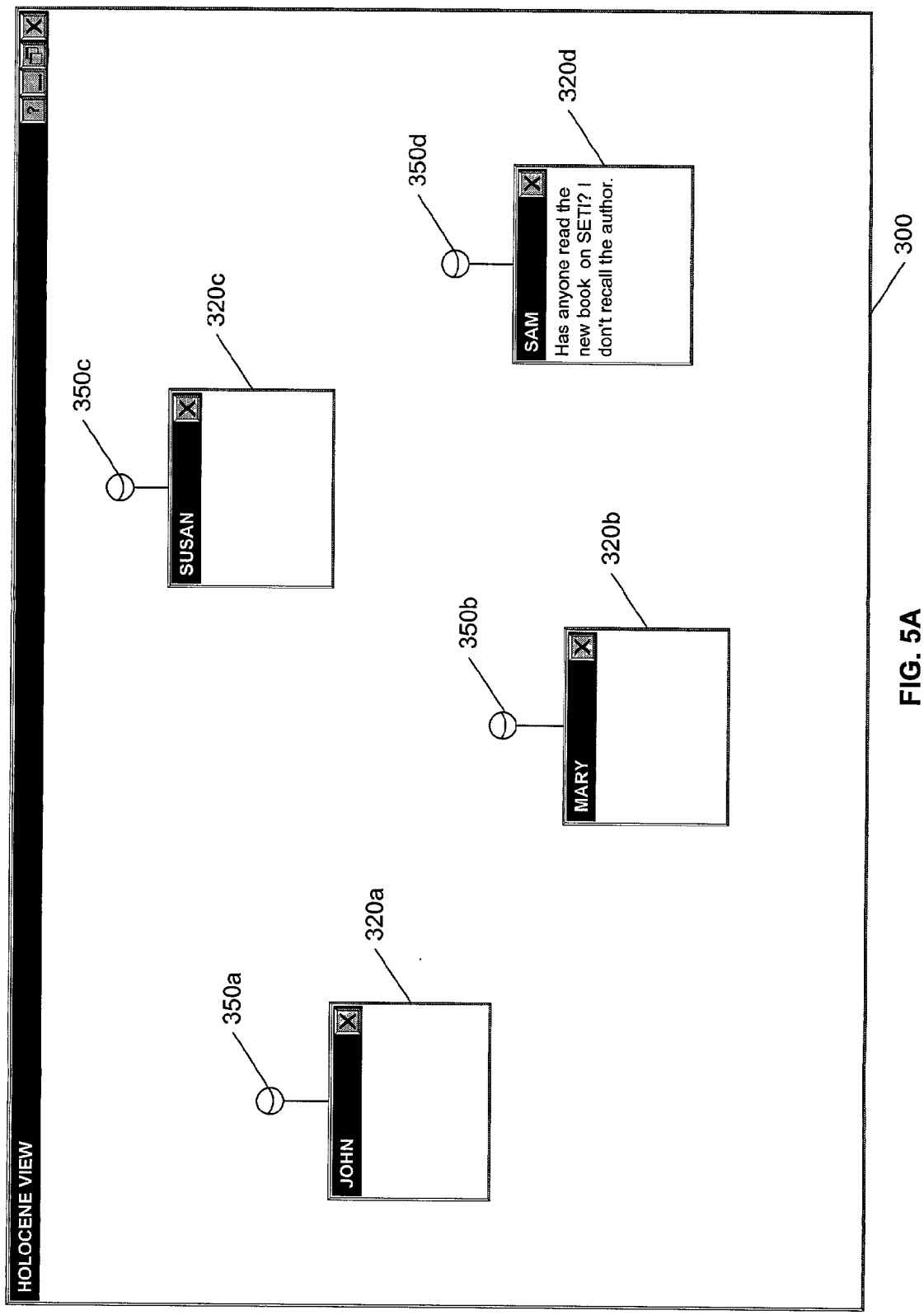

INTERACTIVE COMMUNICATION BETWEEN A PLURALITY OF USERS

CROSS-REFERENCE TO RELATED APPLICATION

This application claims priority to U.S. Provisional Application No. 60/298,148, filed on Jun. 13, 2001, the contents of which are hereby incorporated by reference into this application as if set forth herein in full.

RESERVATION OF COPYRIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to computerized communications, and more particularly to a method, system, and computer program for interactive communication among a plurality of users.

BACKGROUND

Computer-based, on-line communications have become quite popular in recent years. Businesses have joined universities and government institutions in linking up via high-speed data transmission lines, while millions of private citizens have joined in using modems and broadband links that connect their personal computers to networks spanning the globe. Among the many uses of on-line communication, the most important are electronic mail (or "email"), file transfers, direct use and operation of computers at long range, and real-time conversations ("chat") between a plurality of individuals via on-screen exchanges of text, visual, and other information.

FIG. 1 is a diagram of a typical prior art on-line communication system. Each of a plurality of user terminals 100a, 100b, 100c communicates through corresponding communications channels 102a, 102b, 102c of a network 104 to a server computer 106. The user terminals 100a, 100b, 100c may be, for example, personal computers, "thin" clients, hand-held personal digital assistants, and the like, each typically having a display screen or other output device (e.g., speakers) and at least one input device (e.g., keyboard, mouse, touch pad, and/or microphone). The communications channels 102a, 102b, 102c may be of any conventional type, such as telephone modems, digital subscriber line modems, cable modems, dedicated data transmission lines, or wireless links. The network 104 may be a local area network, a wide-area private network (e.g., an "intranet"), or a wide-area public network (e.g., the Internet).

In such a configuration, typical "chat room" and "instant message" computer program applications allow two or more users to exchange text through the user terminals 100a, 100b, 100c. Each participant types or otherwise inputs (e.g., "pastes" from another source) text into a screen or "window" of a user terminal. This information typically is transmitted to the server 106 operating under a "host" protocol. The server 106 redistributes the input text to all participants. Most host protocols are programmed to cause the text lines to appear on a user terminal display screen for all participants. This creates the illusion that the users are participating in a conversation.

In most cases, the text sent by each participant is handled on a line-by-line basis. FIG. 2A is a diagram of a typical prior art window-based chat room showing the procession of text input by two participants, P1 and P2. Each participant inputs text within an associated text editing control 200 (in this example, an edit cursor bar 201 for P1's input is shown in mid-word). All of the text input by all participants appears in a conversation window 202. All participants in this particular chat room, not just P1 and P2, would see the conversation shown in the example. Further contributions are added sequentially to the bottom of the conversation window 202, in the order that the server computer 106 receives them. Meanwhile, earlier lines scroll "upward" and eventually disappear off the top of each user's window or screen display. A scroll bar 204 may be provided to review prior conversations that have scrolled out of the conversation window 202.

In the case of a slow, thoughtful conversation, comments and responses can follow one another in an orderly manner, giving a reasonable simulation of a real world conversation. Unfortunately, most on-line conversations are seldom orderly. In fact, problems with prior art chat systems become apparent soon after a user logs onto almost any chat session, bulletin board, or conference forum.

An immediately apparent problem is interruption. FIG. 2B is a diagram of a typical prior art window-based chat room showing the interrupted procession of text input by three participants, P1, P2, and P3. Starting from the top of the conversation window 202, after P1 inputs a first line of text, P2 begins to input text, but before P2 is done, P3 replies to P1's question. P2's response then appears. The result can be that three participants hold two simultaneous, intertwined (and thus confusing) conversations. In many chat rooms, the number of participants can rise to one or two dozen, resulting in a visual cacophony of mutual interruptions and parallel conversations that are shuffled together like a randomized deck of cards. However, such interrupted conversations may occur with only two participants.

None of the known chat systems take any significant advantage of the many techniques human beings have developed for participating in, perceiving, controlling, or gleaning subtleties from real-life conversations. Present systems simply ignore a wide range of talents already possessed by most users that enable them to process information efficiently in daily life. These drawbacks contribute to inefficiency, user fatigue, and interpersonal misunderstandings. The present invention addresses these problems.

SUMMARY

The invention provides a novel system, method, and computer program for interactive communication among a plurality of users. The invention, called Holocene Conversation Mode ("HCM"), takes advantage of the observation that human beings have developed or utilize a number of real-world characteristics to participate in, perceive, control, and glean subtleties from conversations. These characteristics include proximity and orientation of a listener to other speakers, memory ageing, emphasis by a speaker, relative importance of a speaker to a listener, reputation of a speaker, and the unique human ability to "filter" words of special interest to a listener from overheard conversations of many other speakers.

More particularly, the invention encompasses a computer-based emulation—and extension—of some or all of the following characteristics of natural spoken conversations, such as the type encountered while standing in a room filled with people holding a variety of discussions:

Proximity—Distance or proximity is a good indication of the priority that a listener wants to give to the conversation of another person. One aspect of the invention allows each listener to move towards or away from a speaker.

Orientation—A listener has the option of changing orientation with respect to a speaker in order to pay closer attention. However, a listener can still track conversations occurring outside the listener's direct view (direction of attention). One aspect of the invention allows each listener to turn towards or away from a speaker.

Memory Ageing—Memory ageing is the tendency to selectively let go of short term memories, allowing minor details to be forgotten while holding onto anything that the listener regards as important, unusually noteworthy, or otherwise special to the listener. One aspect of the invention allows older text to be compressed in a manner that mimics memory ageing.

Selective Filtering & Flagging—One aspect of the invention extends natural human abilities to filter and select conversations by automatically providing filter terms and/or by allowing a user to define and optionally weight key words or phrases to allow computer-assisted filtering of the content of other users' conversations. Other forms of selective filtering and flagging are based on user-defined importance terms, emphasis expressed by other speakers, and the reputation of other speakers.

HCM includes a suite of techniques that can be implemented in various combinations in computer software. HCM provides users who participate in real-time computerized conversation forums with an interface that is much improved over present chat systems. These improvements are based upon emulating and extending many of the characteristics that humans for ages have found useful in the real-life world of spoken words and auditory conversation. These techniques allow the conveyance on-screen of much more information than can currently be made available by scrolling lines of text alone, eliminating or reducing the problems inherent in present chat systems. In addition, HCM supports other forms of user interaction, such as allowing a user to give or send an object (e.g., a symbol, token, video segment, file, etc.) to another user, or to allow a user to take an object from another user.

HCM also can be tailored to suit the needs of specialized groups. For example, HCM can provide a more controlled approach in the context of a formal business meeting, or a map-based method of virtual movement ideal for certain types of games. In addition, HCM supports "kiosks", in which users can interact with non-human resources in the context of a host-defined environment.

In particular, embodiments of the invention include a "conversation display space" or "conversation display universe" or "cosmos" that encompasses all user conversations. Each user is assigned a "conversation space" or "user space" within the conversation display space. A user may move an assigned user space within the conversation display universe using any convenient control. Such movement may be user-centric or display-space centric. Each user space includes a content area that displays text and/or non-text information entered by a user when "speaking". The user can add emphasis to content in the form of perception attributes. Each user space also includes an orientation control that is used to direct and indicate the orientation of a user when listening to other users, thereby defining the user's primary direction of attention. The orientation control may be separate from a user space or integrated with the user space.

Other aspects of the invention include:
moving user spaces relative to one another;
changing a user space's primary direction of attention;
varying the size of user spaces as function of: distance; orientation (sole or mutual); reputation; time; and time and selected comparison terms;
varying the size of the content of user spaces as function of: distance; orientation (sole or mutual); and time;
varying the content of user spaces as a function of: distance; orientation (sole or mutual); reputation; time; and time and selected comparison terms;
flagging user spaces and/or their content (and optionally "paging" a user) as a function of: selected comparison terms; reputation; and emphasis applied by other users;
allowing object transference between user spaces, or between a user space and a kiosk object;
providing a "whisper" mode such that input by each user in a "private" conversation is displayed only to other members of the privacy group;
providing a number of optional modes of operation and/or implementation.

Various embodiments of the invention include a method, program, or apparatus for:
interactive communication between a plurality of users, including: displaying a conversation display space having at least two dimensions; displaying a plurality of orientation controls, each having a corresponding user space, within the conversation display space; enabling a user to move or reorient an associated orientation control relative to at least one other orientation control within the conversation display space; and enabling communication of content between at least two user spaces corresponding to such orientation controls;
interactive communication between a plurality of users, including: displaying a conversation display space having at least two dimensions; displaying a plurality of user spaces within the conversation display space; enabling a user to move or reorient an associated user space relative to at least one other user space within the conversation display space; and enabling communication of content between at least two user spaces;
interactive communication between a plurality of users, including: displaying a conversation display universe; displaying, within the conversation display universe, a corresponding user space for each of a plurality of users; enabling each user to input content within the user space corresponding to such user, and communicating such content to the corresponding user space of at least one other user; and for at least one user, displaying selected amounts of content communicated by each other user within the user space corresponding to each such other user;
interactive communication between a plurality of users, including: displaying a conversation display universe; displaying, within the conversation display universe, a corresponding user space for each of a plurality of users; enabling each user to input content within the user space corresponding to such user, and communicating such content to the corresponding user space of at least one other user; for at least one user, displaying the content communicated by each other user within the user space corresponding to each such other user; and selectively varying the size of such content;

interactive communication between a plurality of users, including: displaying a conversation display universe; displaying, within the conversation display universe, a corresponding user space for each of a plurality of users; enabling each user to input content within the user space corresponding to such user, and communicating such content to the corresponding user space of at least one other user; and varying the size of the user spaces;

interactive communication between a plurality of users, including: displaying a conversation display universe; displaying, within the conversation display universe, a corresponding user space for each of a plurality of users; enabling each user to input content within the user space corresponding to such user, and communicating such content to the corresponding user space of at least one other user; and applying filtering criteria to select at least one user space;

interactive communication, including: displaying a conversation display space having at least two dimensions; displaying at least one orientation control, each having a corresponding user space, within the conversation display space; displaying at least one kiosk within the conversation display space; enabling a user to move or reorient an associated orientation control relative to the at least one kiosk within the conversation display space; and enabling interaction between the user space corresponding to the orientation control associated with such user and a kiosk;

interactive communication, including: displaying a conversation display space having at least two dimensions; displaying at least one user space within the conversation display space; displaying at least one kiosk within the conversation display space; enabling a user to move or reorient an associated user space relative to the at least one kiosk within the conversation display space; and enabling interaction between the user space associated with such user and a kiosk.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a table showing an example of storage of a user's conversation status.

FIG. 4B is a table showing an example of storage of a user's conversation content information.

FIG. 5A is a diagram showing a conversation display space with four user spaces.

Like reference symbols in the various drawings indicate like elements.

DETAILED DESCRIPTION

Overview

Figure 1:
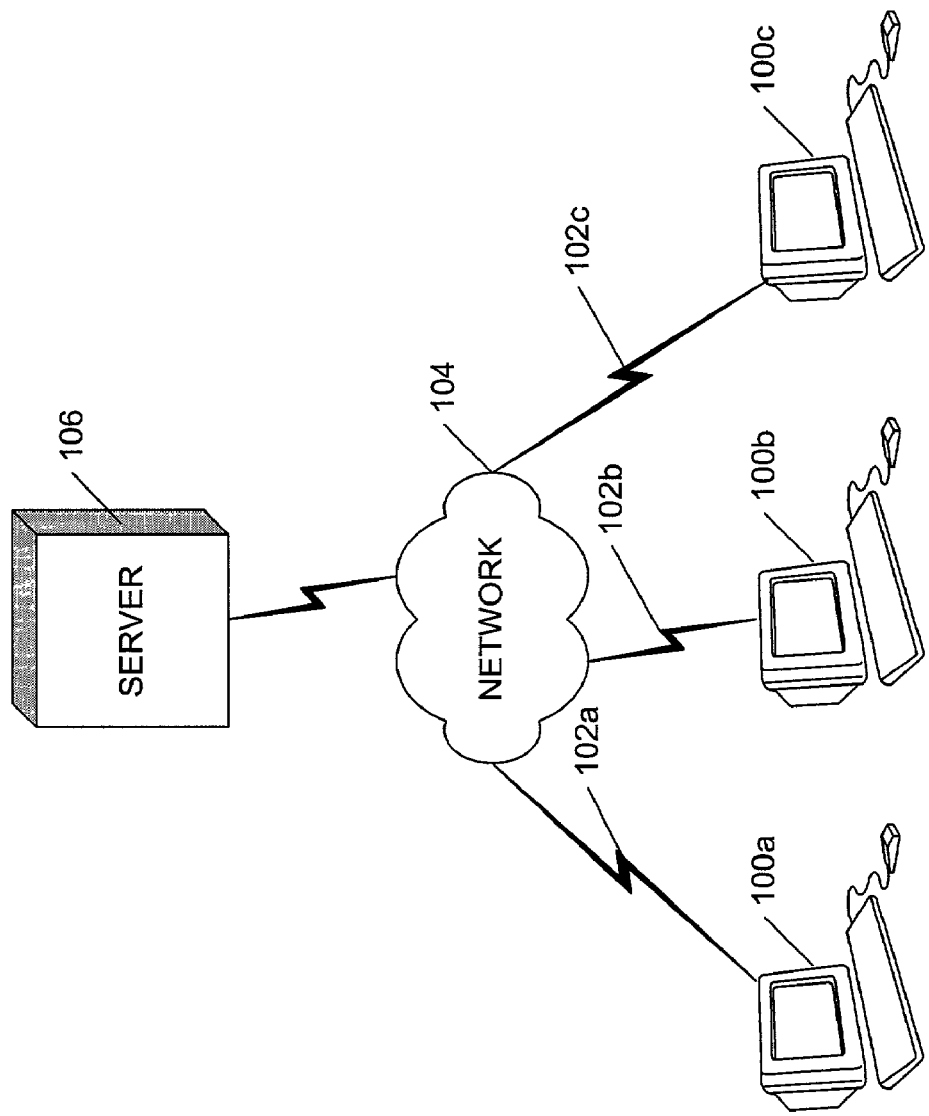
FIG. 1 is a diagram of a typical prior art on-line communication system.
Figure 2B:
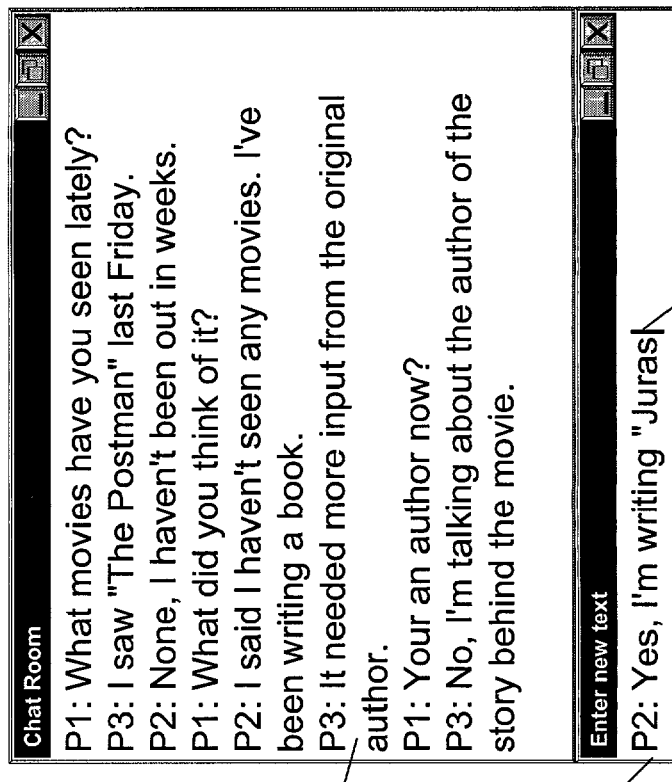
FIG. 2B is a diagram of a typical prior art window-based chat room showing the interrupted procession of text input by three participants.
Figure 2A:
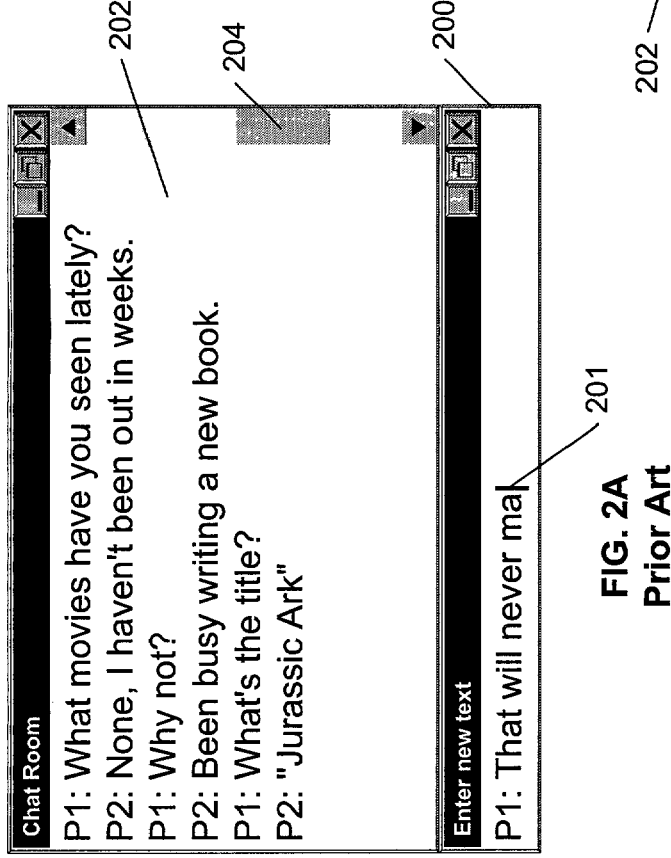
FIG. 2A is a diagram of a typical prior art window-based chat room showing the procession of text input by two participants.

The invention provides a novel system, method, and computer program for interactive communication among a plurality of users. The invention, called Holocene Conversation Mode ("HCM"), takes advantage of the observation that human beings have developed or utilize a number of real-world characteristics to participate in, perceive, control, and glean subtleties from conversations. These characteristics include proximity and orientation of a listener to other speakers, memory ageing, emphasis by a speaker, relative importance of a speaker to a listener, reputation of a speaker, and the unique human ability to "filter" words of special interest to a listener from overheard conversations of many other speakers.

More particularly, the invention encompasses a computer-based emulation—and extension—of some or all of the following characteristics of natural spoken conversations, such as the type encountered while standing in a room filled with people holding a variety of discussions:

Proximity—In real life, each listener is at some distance from each speaker. The conversation of nearer speakers is better heard, while only snippets of conversation of more distant speakers may be perceived. A listener has the option of increasing or decreasing the distance to a speaker. Thus, distance or proximity is a good indication of the priority that a listener wants to accord to a speaker.

Known chat systems basically ignore this characteristic. At best, this characteristic can only be crudely approximated in present chat systems by exiting one chat session and entering or creating another session, after arranging in advance to rendezvous with other interested parties in that alternative session. This approach involves an all-or-nothing decision, unlike most real-life situations, where a listener's attention can be divided between two or more simultaneous conversations, with the listener's attention moving back and forth at will.

Orientation—In real life conversation environments, each listener has some orientation to each speaker. Conversations in front of a listener are better perceived then conversations to the side of or behind a listener. A listener has the option of changing orientation with respect to a speaker in order to pay closer attention. However, a listener can still track conversations occurring outside the listener's direct view (direction of attention). Known chat systems ignore this characteristic.

The characteristics of proximity and orientation can be used to control the size of displayed content of other users, and the display space for such content.

Memory Ageing—In real life conversation, listeners retain memory of things that were said recently, and refer to them mentally as they follow a train of argument or prepare a response. Memory ageing is the tendency to selectively let go of short term memories, allowing minor details to be forgotten while holding onto anything that the listener regards as important, unusually noteworthy, or otherwise special to the listener.

In present chat systems, lines of text scroll upward toward the top of a user's display. A primitive type of "ageing" information is therefore apparent at sight—lines that are higher on the display are older. If the chat system includes a scrolling control, older off-screen lines may be recalled and reviewed; otherwise, when a line disappears at the top of the display, it is forever lost. In any case, a user must review all of the prior text to find an item of interest, since such systems are not capable of selectively culling less valuable verbiage and retaining only text of importance to the user.

Memory ageing can be used to control the size of displayed content of other users, and the display space for such content.

Selective Filtering & Flagging—In real life, a listener's attention varies non-linearly. Although a listener pays closer attention to speakers standing nearby compared to more distant speakers, it is still quite possible for a listener to pick up and take notice of special turns of phrase uttered at a distance. For example, many listeners can hear and notice their name mentioned by speakers holding conversations quite some distance away, even if no other words catch the listeners' attention. One aspect of the invention extends this ability by automatically providing filter terms (such as the user's name) and/or by allowing a user to define and optionally weight key words or phrases to allow computer-assisted filtering of the content of other users' conversations. Such filtering may be "positive" (i.e., using filter terms to select conversations of interest) or "negative" (i.e., using filter terms to suppress or censor conversations).

One form of selective filtering is based on importance. People tend to pay more attention to speakers that the listener rates as more important. "Importance" is a subjective determination made by each listener. However, importance usually includes, as component factors, the speaker's "external" (i.e., real world) reputation, the speaker's "internal" (i.e., chat room or forum) reputation, the topic of the speaker's conversations, and the affinity of the listener to the speaker. Thus, a listener may pay attention to (i.e., select) a conversation of a more important speaker over a less important speaker. One aspect of the invention extends this ability by allowing a user to define and weight importance factors to allow computer-assisted filtering of a group of conversations. Known chat systems ignore this characteristic, although users can subjectively determine the importance of other "speakers".

Another form of selective filtering is based on emphasis expressed by other speakers. For example, in real life, speakers can emphasize points of discussion by speaking louder, stressing words or phrases, changing tone, gesturing, etc. Listeners may respond to such emphasis by giving their attention to one speaker over another, in essence using perceived emphasis as a conversation selection mechanism. While some present chat systems allow a user to change type characteristics or attributes (e.g., typeface, point size, weight, style, color) in messages composed by the user, they are not known to utilize such type characteristics as a way of allowing the user to select other conversations to join or allowing such characteristics to actively affect a filtered version of the conversation. One aspect of the invention allows each speaker to use such type characteristics or attributes to indicate emphasis, and extends the concept by using emphasis to allow computer-assisted filtering of a group of conversations.

Another form of selective filtering is based on the reputation of other users. In real life, listeners tend to pay attention to speakers having a high reputation. One aspect of the invention extends this characteristic by allowing assignment (manually or automatically) of reputation scores to speakers and flagging speakers having selected scores. Further extensions allow a speaker's reputation (or "charisma") to be automatically determined (for example, based on the number of other participants who chat with or listen to the speaker).

Selective filtering can be combined with memory ageing to effect a form of content compression, in which a user's filter terms of all types can be used to determine what portions of other users' content to display as function of time.

HCM includes a suite of techniques that can be implemented in various combinations in computer software. HCM provide users who participate in real-time computerized conversation forums with an interface that is much improved over present chat systems. These improvements are based upon emulating and extending many of the characteristics that humans for ages have found useful in the real-life world of spoken words and auditory conversation. These techniques allow the conveyance on-screen of much more information than can currently be made available by scrolling lines of text alone, eliminating or reducing the problems inherent in present chat systems. In addition, HCM supports other forms of user interaction, such as allowing a user to give or send an object (e.g., a symbol, token, video segment, file, etc.) to another user, or to allow a user to take an object from another user.

HCM also can be tailored to suit the needs of specialized groups. For example, HCM can provided a more controlled approach in the context of a formal business meeting, or a map-based method of virtual movement ideal for certain types of games. In addition, HCM supports "kiosks", in which users can interact with non-human resources in the context of a host-defined environment.

Conversation Display Space & User Spaces

Figure 3A:
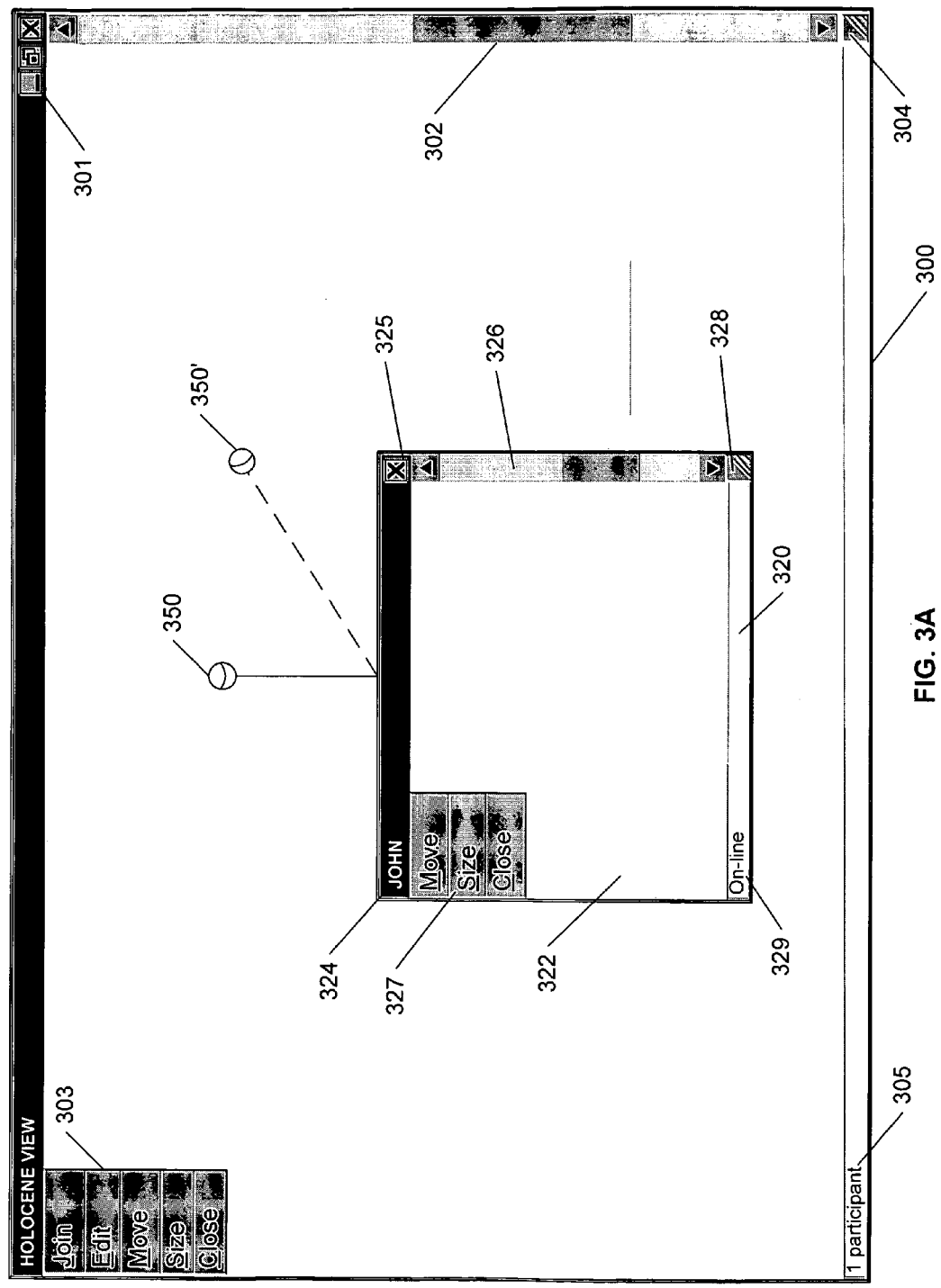
FIG. 3A is a diagram of one embodiment of the invention, showing a conversation display space and a user space.

FIG. 3A is a diagram of one embodiment of the invention. A user's display screen (e.g., such as the display screen of user terminal 100 in FIG. 1) would depict some or all of a "conversation display space" 300 that encompasses all user conversations. In some embodiments, the conversation display space 300 may comprise the entire display screen or even exceed that size (i.e., a "virtual" conversation display space 300 may be larger than a particular user's display screen). A conversation display space 300 may include various window controls, such as a window control icons 301, scroll bars (a vertical scroll bar 302 is shown), drop-down menu (a window-control menu 303 is shown), window sizing control 304, and status bar 305. As should be apparent, other controls may be included. While a conventional rectangular window is shown for the conversation display space 300, other shapes (e.g., round or round-cornered rectangular) and display objects may be used.

Each user is assigned a "user space" 320 within the conversation display space 300. Two user spaces 320 are needed for one user to hold a conversation with another user, but only one user space 320 is needed for a user to interact with non-human resources, as discussed below. A user may move an assigned user space 320 within the conversation display space 300 using any convenient means, such as a pointing device (e.g., a mouse or touchpad), keyboard commands (e.g., cursor keys), or voice control. Such movement may be user-centric (i.e., all other users' user spaces 320 within the conversation display space 300 move while a specific user's user space 320 remains stationary) or display-space centric (i.e., a user's user space 320 moves while all other user's user spaces 320 within the conversation display space 300 remain stationary).

Each user space 320 includes a content area 322 that displays text and/or non-text information (e.g., computer files, images, sounds, videos, etc.) entered by a user when "speaking". Input to the content area 322 may be by any convenient means, such as by typing on a keyboard, voice dictation, pointing-and-clicking on a display screen-based "virtual" keyboard or symbol palette, pasting objects from a "clipboard", etc. Following current conventions, entered items "scroll" upwards, so that the oldest entry is at the top of the content area 322. However, the reverse rule can be used as well. Termination of entry of content into the content area 322 may be indicated by any desired delimiter, such as the press of the "ENTER" key of a keyboard.

While FIG. 3A shows that the content area 322 is both the entry and display area for user content, separate entry and display areas may be used. Thus, a text edit box may be used to allow a user to type in and edit content, which is only displayed in the content area 322 after the user indicates that the text is ready for "publication" (e.g., by pressing the "ENTER" key of a keyboard). A user may also choose to separate the entry and display areas of his or her user space 320, allowing one or the other to be hidden when not in use to allow for more display space for the user spaces 320 of other users.

Typically, each user space 320 displays a user's identifier (e.g., actual name, screen name, initials, symbol, picture, or caricature), such as in the title bar 324 of the user space 320. User spaces 320 may include various window controls and menus, such as a "close window" icon 325, scroll bars (a vertical scroll bar 326 is shown), a window-control drop-down menu 327, window sizing control 328, and status bar 329. As should be apparent, other controls may be included. While a rectangular window is shown for the user space 320, other shapes (e.g., round-cornered rectangular, circular, etc.) and display techniques may be used.

The user space 320 includes an "orientation control" 350. The orientation control 350 is used to direct and indicate the orientation of a user when listening to other users, thereby defining the user's primary direction of attention. A user may manipulate the orientation control 350 (e.g., using a pointing device, such as a mouse or touchpad, or using keyboard commands or voice control) in order to choose a particular direction of orientation for "listening" to other users. For example, the orientation control 350 in FIG. 3A may be angled by a user to point towards another user, such as by clicking on and dragging the end of the orientation control 350 to a new position. A changed position for the orientation control in FIG. 3A is depicted in dotted outline at 350'. Other control mechanisms, such as a graphical rotary knob control, may be used to change the orientation of a user's orientation control 350.

Figure 3C:
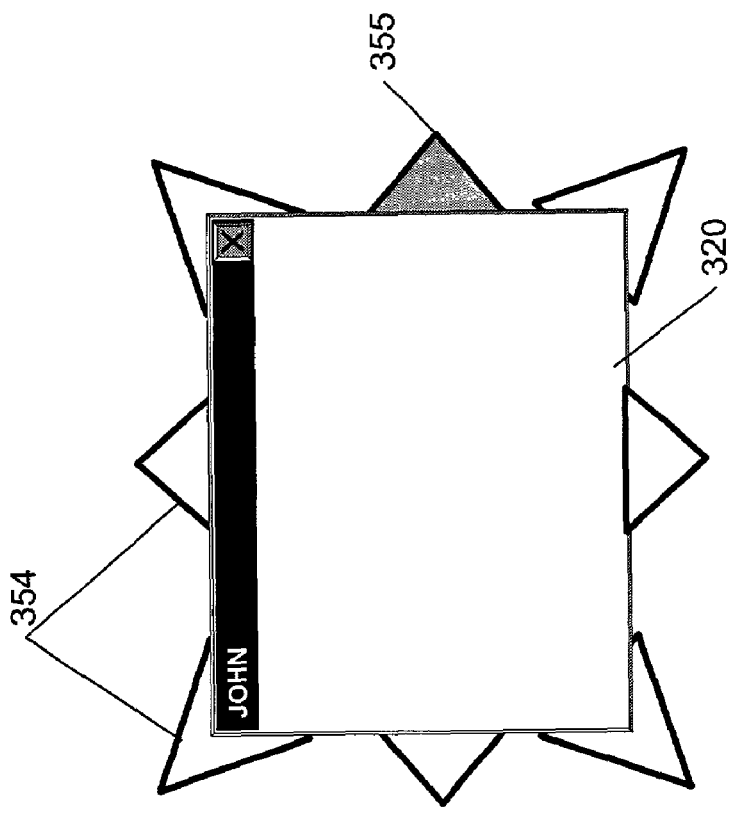
FIG. 3C is a diagram of a user space having a third type of orientation control.
Figure 3B:
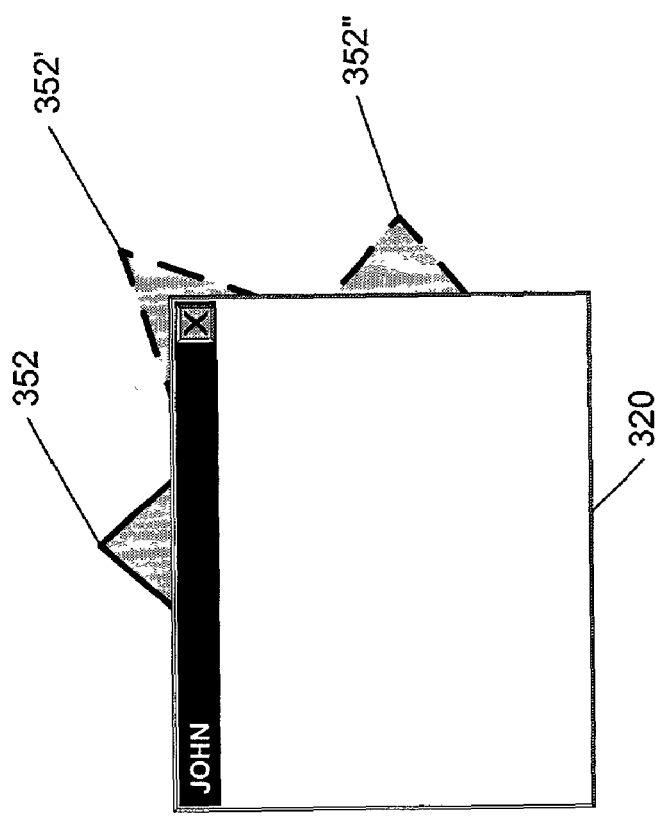
FIG. 3B is a diagram of a user space having a second type of movable orientation control.

FIG. 3B is a diagram of a user space 320 having a movable orientation control 352. This orientation control 352 may be moved around the perimeter of the user space 320 by the user (e.g., by clicking and dragging), as shown in dotted outline at 352' and 352".

FIG. 3C is a diagram of a user space 320 having another orientation control 354, shown as a "star" of triangles around its perimeter (simple arrows may also be used). A particular "point" (one example is shown in gray at 355) of the orientation control star 354 may be selected by a user to indicate the user's direction of attention.

Figure 3D:
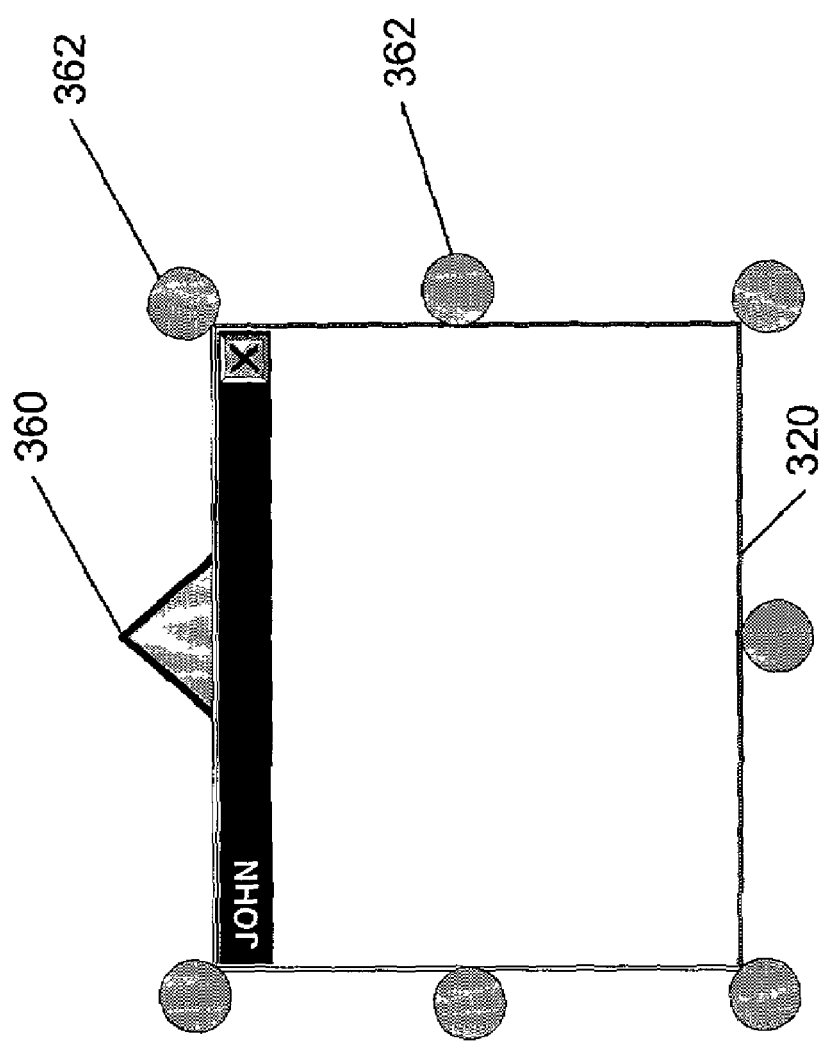
FIG. 3D is a diagram of a user space having a fourth type of movable orientation control.

FIG. 3D is a diagram of a user space 320 having another type of movable orientation control. An arrow-like orientation indicator 360 may be "moved" around the periphery of the user space 320 by selecting (e.g., by pointing and clicking) one of the control circles 362. Such selection would graphically "move" the arrow-like orientation indicator 360 to the selected position, while a control circle 362 would be displayed at the previous location of the orientation indicator 360.

An orientation control may be embodied in many different ways and with many different shapes. Further, as described below, an orientation control need not be integrated with its associated user space. Different styles of orientation controls may be used together. Users may be assigned an orientation control style, or each user may be allowed to select a personal style of orientation control.

User Conversation Information

Humans are already well equipped to make use of information about proximity, orientation, memory ageing, reputation, and selective filtering in real life situations. A system implementing HCM may convey some or all of this information in a number of distinct and independent ways by keeping track of various combinations of orientation, position, key words, importance terms, reputation, emphasis, and time for each user's user space.

A system implementing HCM may keep track of the relative position of each user's user space 320 within a conversation display space 300. Any convenient coordinate system may be used, including Cartesian (X, Y) and polar (r, θ) for two-dimensional implementations, and Cartesian (X, Y, Z) or spherical (r, φ, θ) for three-dimensional implementations. The units may be arbitrary, or may be derived from the relative location (e.g., in pixels) of a user's user space 320 with respect to a selected reference point of the conversation display space 300 depicted on the user's display screen. These values might then be rescaled to arbitrary units and stored in an implementing system, since the display screens of users would typically differ in resolution. Preferably, such position information is stored within an appropriate data structure within a system supporting a conversation display space 300. FIG. 4A is a table showing an example of how information about a user's conversation status (including the user's position) can be stored. In this example, the user space for user "Sam" has an X, Y position of "25, 100" (in arbitrary units) within a conversation display space 300.

A system implementing HCM may keep track of each user's direction of attention. In a two-dimensional implementation, the direction of attention may be defined as an angle from a reference line (such as a line from the center of the user's user space 320 to the "top" of the conversation display space 300) to a line indicating the orientation of a user's orientation control 350 (e.g., the angle θ in FIG. 3A). In a three dimensional implementation, the direction of attention may be defined as a declination and right ascension from a reference line to a line indicating the orientation of a user's orientation control 350. Preferably, the direction of attention is stored within an appropriate data structure within a system supporting a conversation display space 300. FIG. 4A shows an example of how information about a user's direction of attention can be stored. In this example, user "Sam" has a current direction of attention of 30 degrees relative to the top of a conversation display space 300. Alternatively, direction of attention can be coded, such as a number from 1 to 8, each number representing a sector of 45 degrees.

A system implementing HCM may allow a user to define key words and phrases (with optional weights) to monitor in the conversation of other users. In the example shown in FIG. 4A, user "Sam" has stored three words or phrases of interest as text strings with a suitable delimiter. Other data structures can be used, including hash codings (e.g., soundex coding, which applies an algorithm for encoding a word so that similar sounding words encode the same). The list of key words may be highlighted if they appear in conversation, even between speakers at the far periphery of a display screen or conversation display space. Examples of key words include the user's own name, company, or products.

Similarly, a system implementing HCM may allow a user to define importance terms (with optional weights) to monitor in the conversation of other users. In the example shown in FIG. 4A, user "Sam" has stored two importance terms as text strings, each with associated weights. Accordingly, any speaker named "Asimov" will be given top priority over other speakers; otherwise, any speaker discussing the topic of "science fiction" will be given priority over other speakers. Again, other data structures can be used, including hash codings.

A system implementing HCM may allow a user to define "topics" about which the user wishes to converse, in order to attract other participants in a conversation display space 300 having similar discussion interests. The topics may be stored, for example, in the user's conversation status table, as shown in FIG. 4A, as another form of "meta" data. A user's current topic may be made visible to other participants, such as by display in the title bar of a user's user space 320. Such a system may also allow a user to enter and store profile data, such as the user's real name (as opposed to screen name), gender, interests, educational and personal background, etc. Profile information may be stored, for example, in the user's conversation status table, or in a separate data structure.

Such a system may also keep track of each user's "external" reputation as well as each user's "internal" reputation within a conversation environment, as measured or mediated by a host system. For example, an "external reputation" score may be assigned to each user by the human host of a forum, or automatically by analyzing user profiles. Thus, for example, users indicating that they are lawyers may be automatically assigned a higher "external reputation" score than users indicating that they are science fiction authors. Similarly, an "internal reputation" score may be assigned to each user by the human host of a forum, or by a system of secret or open balloting among forum participants, or by keeping track of how often the user is the focus of attention of other participants in the forum. Such scores may be stored in a table such as the type shown in FIG. 4A.

A running timer may be maintained for each user to indicate time elapsed since a user began a conversation session. Alternatively, a time stamp value can be stored once indicating when a conversation session started relative to a fixed time point (e.g., the Universal Time Coordinated time standard); this value may be used in later calculations to compute elapsed time. FIG. 4A shows one example of how such information may be stored in a system implementing HCM. In this example, a running timer shows that user "Sam" has been online in a conversation session for 410 seconds.

Inputs made in the content area 322 of each user space 322 are stored in an appropriate data structure. FIG. 4B is a table showing one example of how such conversation content information may be stored in a system implementing HCM. In this example, each delimited text entry is stored in a table row. The delimiter may be defined by a host system. A typical delimiter is the "ENTER" key of a keyboard.

The content area 322 of each user space 320 also allows a user to emphasize text by setting various "perception attributes", alone or in combination. For example, a user can define text size, typeface, color, weight, thickness (e.g., normal or bold), shape (e.g., upright or italic), and effects (e.g., underlined, shadow, outlined, embossed, engraved, strikethrough, subscript, superscript, capitalization, blinking, background color, highlighting, etc.). Perception attributes can be extended to non-text information, such as allowing a user to vary the loudness of sound input to mimic whispering or shouting, or blinking an image or flashing the background of an image, or attaching sound effects to text. Accordingly, "perception attribute" encompasses any way of changing the appearance or playback of some or all of a user's input into a content area 322.

"Perception attribute" can also encompass any way of changing the appearance of a user space itself, such as by changing the color or weight of its border or title bar, or flashing the border or title bar, or setting a flag within its status bar.

A system implementing HCM may keep track of each user's applied perception attributes. This information may be tracked by character, word, sentence, line, or other input portion. FIG. 4B shows one example of how such perception attributes may be stored in a system implementing HCM. In this illustration, three perception attributes (italics, underlined, bold) are tracked in an array 400 for each sentence 401, 402 of a user's text input to the content area 322 of an associated user space 320. For convenience, each delimited text portion may be given an identification tag (e.g., T1, T2) or a "line" number. The table shown in FIG. 4B can be extended to track any desired number of perception attributes, and other data structures (e.g., vectors) may be used to capture such information.

A system implementing HCM may "time stamp" each entry made in the content area 322. A time stamp may be set at any desired text delimiter, such as certain punctuation marks (e.g., period, semicolon, question mark, exclamation mark) or a "new line" indicator (e.g., each press of the "ENTER" key of a keyboard). FIG. 4B shows one example of how each sentence of a user's input can be time stamped. In this example, the time stamp value is the number of seconds that have elapsed since the user began a conversation session (e.g., "logged" into a conversation display space 300) until the end of each sentence is reached (here, denoted by a period). Other time schemes could be used, such as the number of seconds (or fractions of a second) elapsed from a fixed time point (e.g., the beginning of the twenty-first century), or a current clock time (rather than elapsed time), possibly referenced to the Universal Time Coordinated standard. Time stamps may also be associated with the entry into the content area 322 of non-text information, such as computer files, images, sounds, videos, etc.

Similar information may be tracked for all users participating at any particular time within a conversation display space 300. Such information typically would be stored within a system controlling a conversation display space 300 for a plurality of participants. For example, a master table can be used to store current tables similar to those shown in FIGS. 4A and 4B for each user participating at any particular time within a conversation display space 300. By tracking such information and applying simple rules of geometry, the relative orientation and position of each user with respect to every other user can be determined. In addition, each participant's identity, key words, importance terms, topics, reputation, time-stamped content area information, and perception attributes are known and can be used to mimic memory ageing and provide selective filtering.

Multiple User Basic Operation

FIG. 5A is a diagram showing a conversation display space 300 with four user spaces 320a–320d. Of course, more or fewer user spaces 320 may be present during any particular conversation session. In the illustrated example, each user is in a passive "listening" mode (i.e., the orientation controls 350a–350d are not directed towards other users) within a display-centric embodiment. In this state, content input by each user is displayed within the user space assigned to that user. Thus, in this example, user "Sam" has input two sentences. That input typically would be transmitted to and stored in a table similar to FIG. 4B within a host system supporting the conversation display space 300. In turn, the host system normally would transmit that input to all other users for display in a user space 320d associated with user "Sam" and depicted in the conversation display space 300 shown on each user's display screen.

Figure 5B:
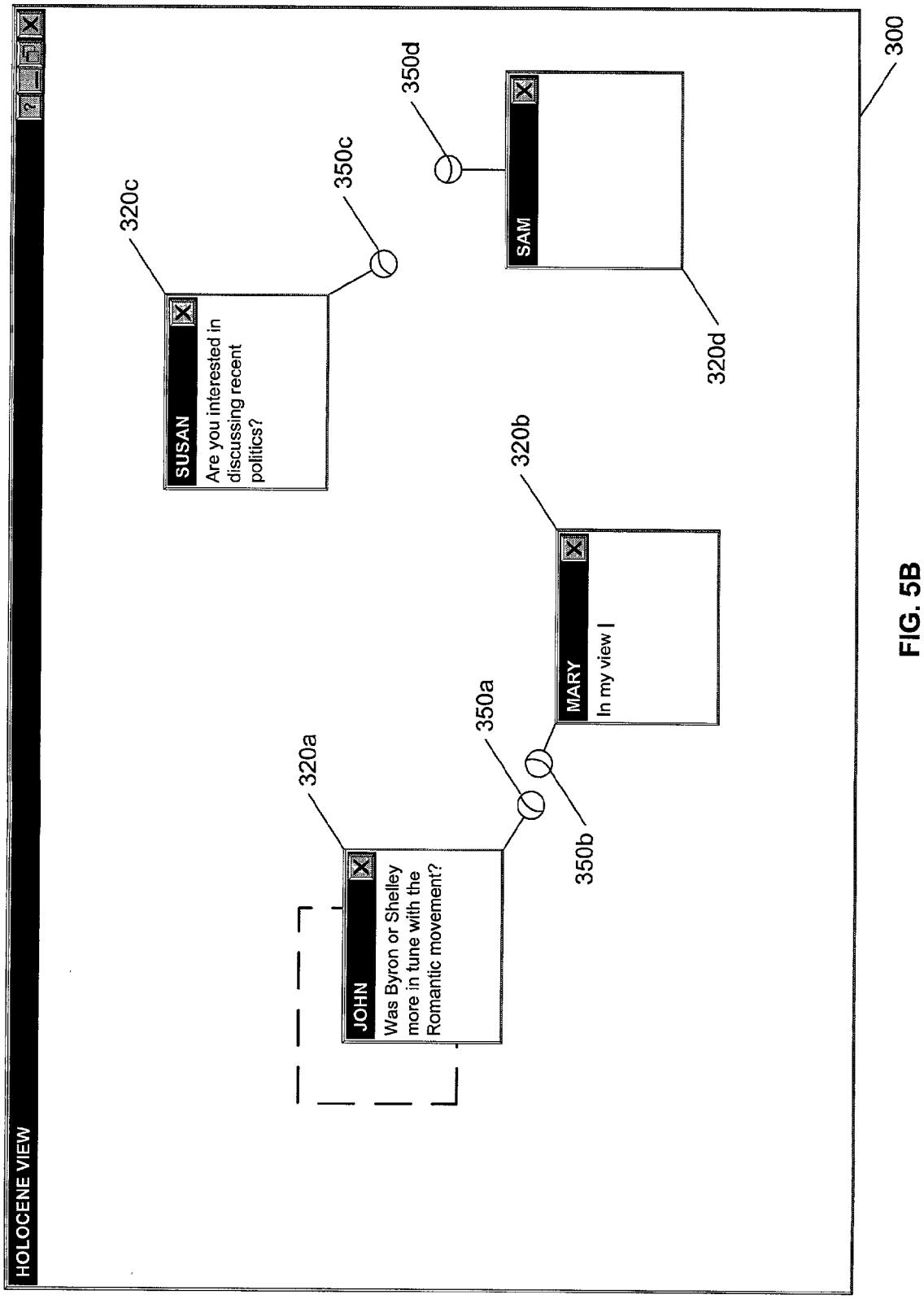
FIG. 5B is the diagram of FIG. 5A at a subsequent time.

FIG. 5B is the diagram of FIG. 5A at a subsequent time. User "John" has moved his user space 320a from the position shown in dotted outline closer to the user space 320b of user "Mary", and redirected his orientation control 350a to point towards "Mary". "John" has also entered text into the content area of his user space 320a. "Mary" has redirected her orientation control 350a to point towards "John" and has begun to reply. Additionally, "Susan" has redirected her orientation control 350a to point towards "Sam" and entered text into the content area of her user space 320c. "Sam" at this point has not moved his user space 320d, redirected his orientation control 350d, or entered any text into the content area of his user space 320d.

At a glance, each user can determine who is talking to them (based on proximity and the direction of each other user's orientation control) and can see each "speaker's" uninterrupted "speech" within their corresponding user space 320.

FIGS. 5A and 5B thus show three aspects of one embodiment of the invention: dedication of a user space 320 per participant, movement of each participant's user space 320 with respect to other participants in a conversation display space 300, and changing the direction of attention of a user space 320.

User-Centric Viewpoint

Figure 6A:
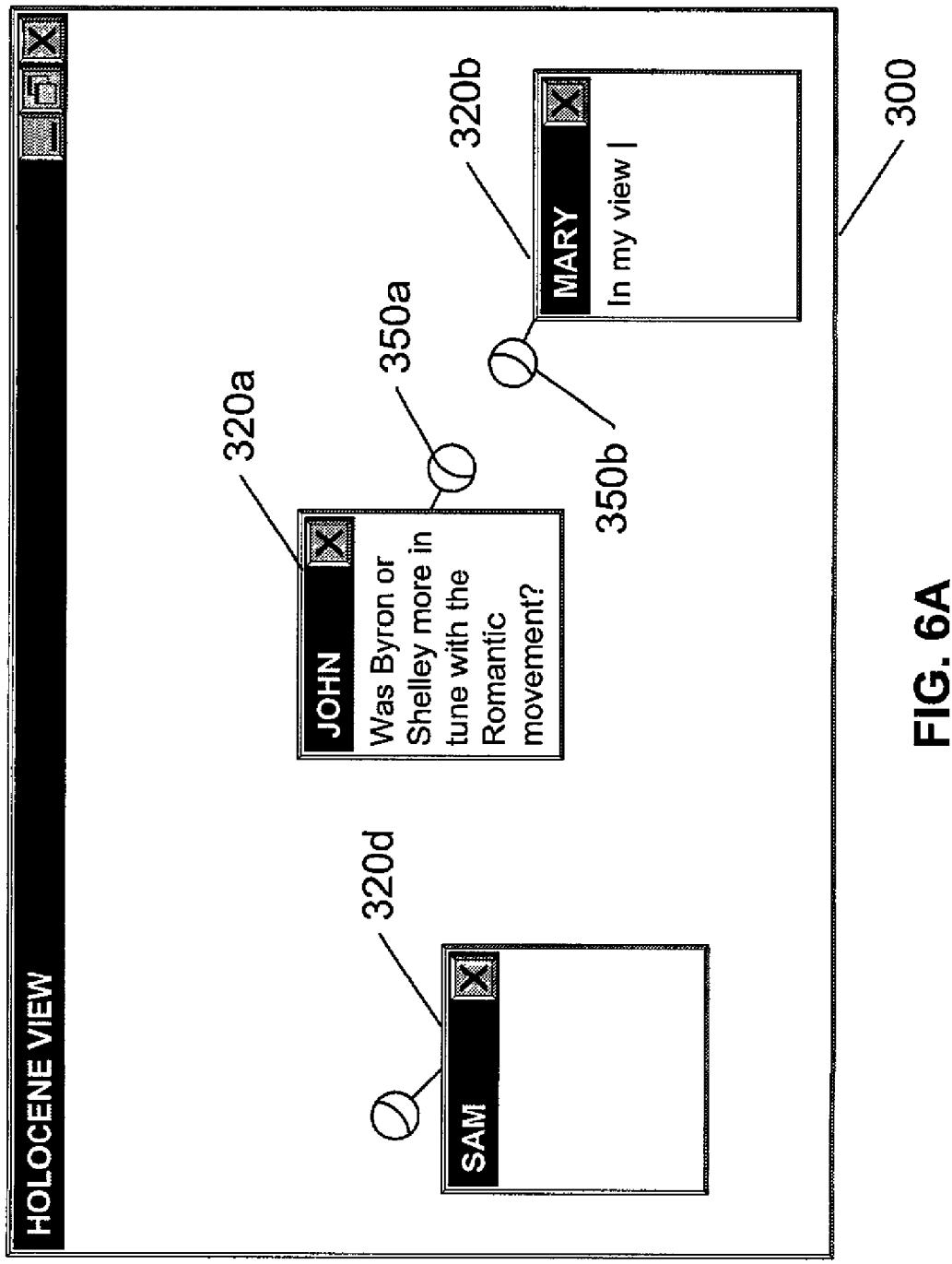
FIG. 6A is a diagram of a conversation display space as seen by a first user.
Figure 6B:
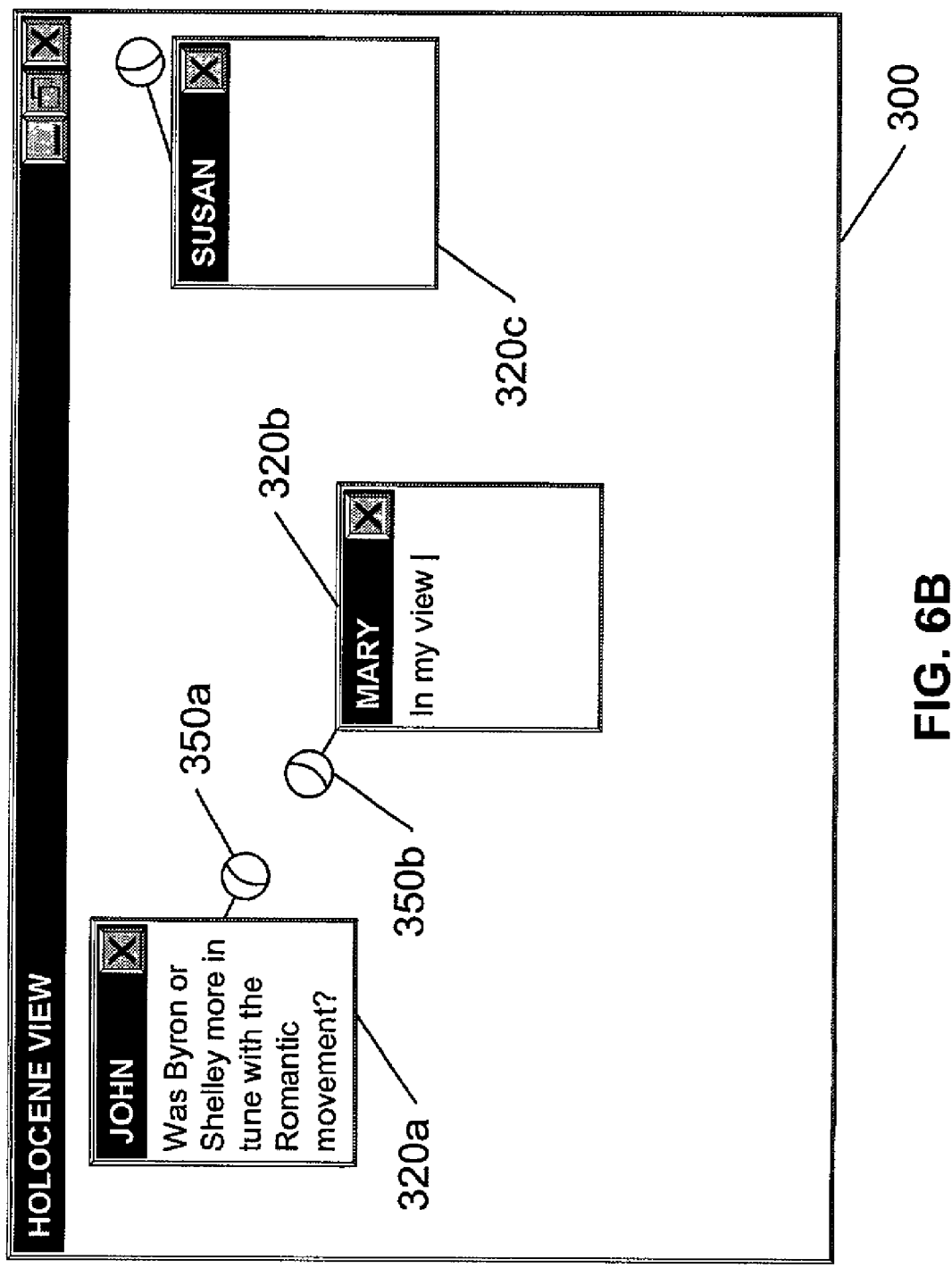
FIG. 6B is a diagram of the same conversation display space of FIG. 6A, but as seen by a second user.

FIGS. 6A and 6B are diagrams showing a conversation display space 300 with four user spaces 320a, 320b, 320c, 320d in a "user-centric" view. FIG. 6A is a view of the conversation display space 300 seen by user "John". In this view, the user space 320a for "John" is centrally located in the conversation display space 300. Surrounding "John's" user space 320a are two user spaces 320b, 320d for users "Mary" and "Sam", respectively. FIG. 6B is a view of the same conversation display space 300 of FIG. 6A, but as seen by "Mary". In this view, the user space 320b for "Mary" is centrally located in the conversation display space 300. Surrounding "Mary's" user space 320b are two user spaces 320a, 320c for users "John" and "Susan", respectively. In this example, "John" cannot see distant "Susan", and "Mary" cannot see distant "Sam".

In a user-centric embodiment, the user space 320 for a user remains substantially centered within the conversation display space 300. Accordingly, when a user "moves" an associated user space relative to other user spaces, what appears to happen within the conversation display space 300 is that the user spaces of all other users move past the "central" user's user space in the direction opposite to the central user's chosen direction of movement. Thus, if a user "moves" his or her user space 320 left, the conversation display space 300 shows the user spaces 320 for all other users moving right.

In one embodiment of a user-centric view, each user's display is generated by a system (e.g., a host server) that uses the coordinates of each user's user space 320 to maintain a "global" map of the position of all users in a conversation display space 300. The system provides each user with a "view" of the map sized to fit within the user's display screen and centered on the user's own user space 320.

Movement of a user space with respect to other user spaces may be constrained, if desired, so that a user's user space cannot pass "over" another user's user space (just as a person would not normally walk through a conversation between two other people). In such cases, a user must move (or "walk") an associated user space "around" the user spaces of other users. Alternatively, a user can point to or designate a new location within a conversation display space 300 and "teleport" (instantly transfer) or "levitate" (e.g., appear to become detached from the plain of a two-dimensional conversation display space 300 and "float" over intervening user spaces) the user's user space 320 to the indicated new location. Further, user spaces may overlap. Other means of indicating and controlling movement of user spaces may also be used as desired.

World View

Figure 7:
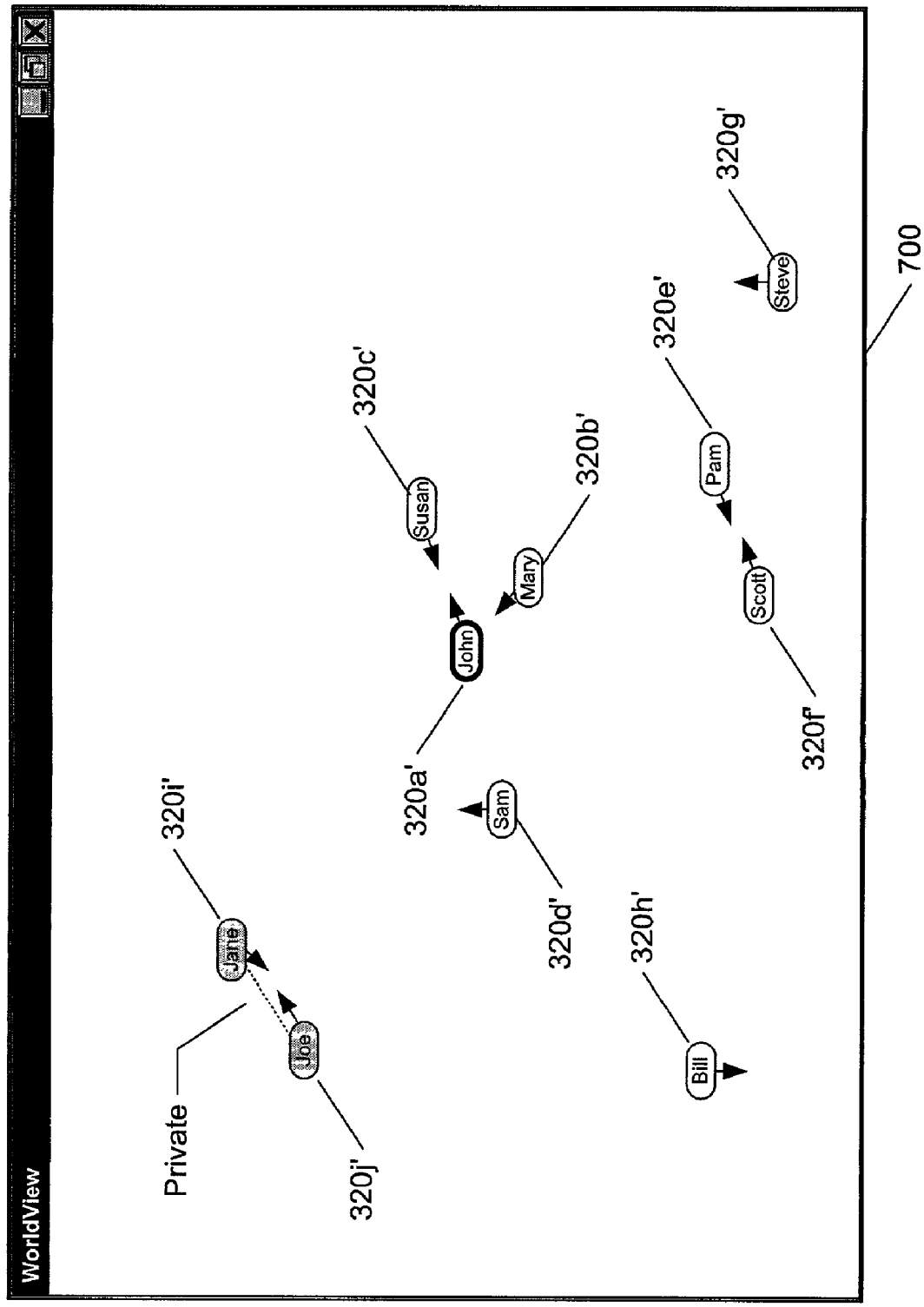
FIG. 7 is a diagram showing an optional "world view" of a conversation display space as seen from a user-centric viewpoint.

FIG. 7 is a diagram showing an optional "world view" 700 of a conversation display space as seen from a user-centric viewpoint. A user would select the world view 700 (e.g., from a "right-click" menu or by pressing a function key) to help see the location of other users within a conversation display space.

In this example, the user space for user "John" is represented as an icon 320a'. Near the icon 320a' for "John" are icons 320b', 320c', 320d' for nearby users "Mary", "Susan", and "Sam", respectively. Preferably, each icon also indicates the current direction of attention of the associated user.

Because entire user spaces 320 are not shown in the world view 700 of FIG. 7, additional space is available within the conversation display space to show more distant participants 320e'–320j' relative to the central location of user "John". Thus, this view allows user "John" to see the availability of many more participants within the conversation display space 300. User John may also "walk" to a new location (e.g., by commanding a continuous incremental movement across the display screen using cursor keys or a pointing device), or "teleport" or "levitate" to a new location (e.g., by clicking on the world view representation with a pointing device). A world view 700 of a conversation display space may be displayed concurrently with a conversation display space 300, so that a user may view a surrounding local area of readable user spaces 320 while observing the positions of more distant participants.

Compression, Filtering, & Flagging

A system implementing HCM can include any of several innovative techniques that allow the system to replicate the effects of variable proximity, orientation, importance, reputation, time, and selective filtering in representing conversations. These techniques allow several types of compression, enabling a user's screen to contain more information, and cover a broader reach of cyber-space, than would otherwise be possible. Some of these techniques mimic the effects of sound in the real world, as perceived by normal human ears, but others are extensions of the characteristics of natural spoken conversations. In addition, some of these characteristics can be used to automatically flag other conversations of interest to a listener.

User Space Compression

The number of user spaces 320 that may be displayed at one time on a user's display screen is constrained by the limits of readability of text within the user spaces, even if the bounds of a conversation display space 300 exceed the size of the display screen (i.e., a "virtual" conversation display space). Another aspect of the invention that is particularly useful in a user-centric embodiment is to use proximity and/or orientation information to control the displayed size of other users' user spaces. The displayed size of other users' user spaces may also vary as a function of such users' internal and/or external reputation scores.

Figure 8:
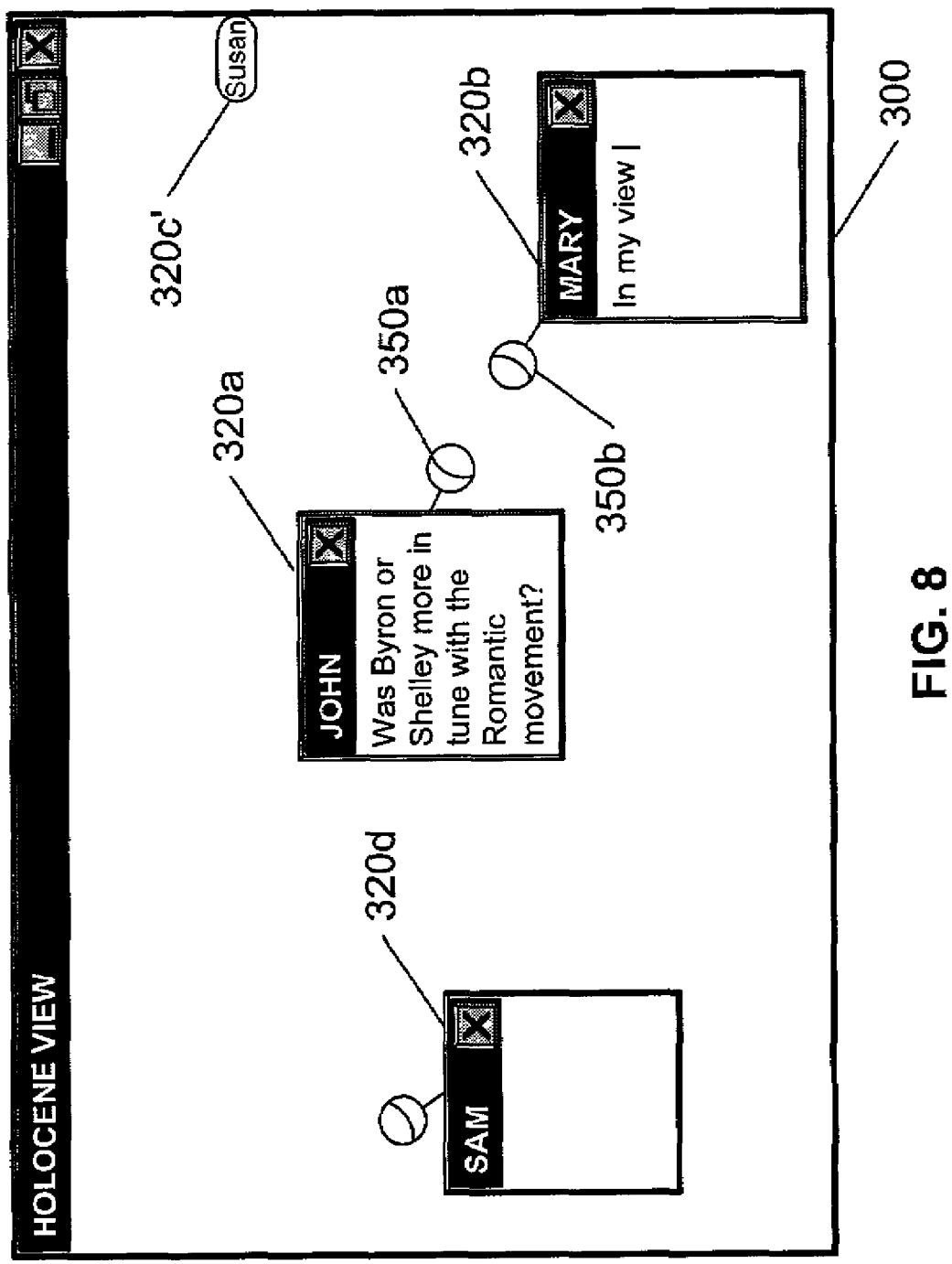
FIG. 8 is a diagram of a user-centric view showing reduction in user space size as a function of distance and/or orientation from a central user.

FIG. 8 is a diagram of a user-centric view showing reduction in user space 320 size as a function of distance and/or orientation from a "central" user. The user space 320b for user "Mary", closest to the user space 320a for central user "John", is shown normal size. The user space 320d for user "Sam", further from the user space 320a for central user "John", is shown at a slightly reduced size. The user space for user "Susan", farthest from the user space 320a for central user "John", is shown as a token or icon 320c'. The icon 320c' indicates that the user space for "Susan" with respect to the user space 320a for "John" is beyond a selected distance, and thus out of "John's" "hearing" range.

In one embodiment, on approaching an edge of the displayed portion of a conversation display space 300 with respect to a central user, user spaces begin to shrink in size, getting progressively smaller (a technique called "screen warping"). User spaces 320 at the edges are thus much smaller than those closer to the center, allowing a larger number to fit at the periphery of the display screen than near the center. The central user can thus see that other participants are nearby, even if their current content is not visible.

User spaces not in the proximity of a user may be displayed as an icon showing only the distant participants' identity, as illustrated in FIG. 8. Alternatively, very distant users may be shown only as non-identified symbols (e.g., small circles), or not displayed at all (i.e., they "vanish" from view). An embodiment that displays icons or other symbols can further provide a function that allows the central user to "eavesdrop" on an associated conversation. For example, a user could "click" on such an icon and an associated user space 320 would pop-up to a readable size, possibly overlaying other conversations temporarily.

Screen warping is dynamic, in that the size depiction of user spaces changes as a user moves. Thus, in the example of FIG. 8, if user "John" moves his user space 320a to the right, the user space 320d for "Sam" will continue to shrink, until replaced by an icon or other symbol, and then may vanish entirely. Meanwhile, the user space 320c for user "Susan" will transform from an icon 320c' to a small user space 320c, which will continue to grow to a "normal" size as "John" gets closer. Further, new user spaces may appear on the right edge of the screen as "John" continues to move in that direction, indicating that "John" is approaching other participants that previously had been out of "hearing" range.

Because the implementing system keeps track of the coordinates of each user, it is straightforward to calculate the distance of each user's user space with respect to the user space of each other user. For example, if the user space 320a for user "John" has X, Y coordinates of {100, 50}, and the user space 320b for user "Mary" has coordinates of {150, 25}, then the distance D between the two user spaces can be computed as follows (in this example, D is approximately equal to 56):

$$D=\sqrt{(x_1-x_2)^2+(y_1-y_2)^2}$$

The computed distances between user user spaces may be determined as specific distances (in real or arbitrary units), or coded into "zones" (e.g., "adjacent", "near", "far") centered on each user's own user space. Alternatively, "distance" may be measured as the number of user spaces that lie between a user's user space and each other user's user space. Using this approach, in the example of FIG. 8, the "distance" between "John" and "Mary" is zero (i.e., no intervening user spaces), while the "distance" between "Sam" and "Mary" is one (i.e., "John's" user space intervenes).

A number of algorithms may be used for adjusting the displayed size of each user space. One such algorithm is to let Dij represent the distance between user i's user space and some other user j's user space, measured in zones (e.g., 1="adjacent", 2="near", 3="far", 4="off edge") centered relative to user i's user space. Assume that user spaces for other users j have four display sizes, Sj (e.g., 1="normal", 2="smaller", 3="smallest", 4=token representation). Then simply directly map Sj to Dij (e.g., if Dij=2, the size Sj of user j's user space would be set to 2). This algorithm can be extended to more or fewer reductions in user space size as distance increases.

The orientation of the central user can also be used to adjust the displayed size of other users' user spaces. For example, in FIG. 8, the user space 320b for user "Mary" is shown normal size in part because "John's" orientation control 350a is directed towards "Mary's" user space 320b. The user space 320d for "Sam" is shown at a slightly reduced size in part because it is outside "John's" direction of attention. If "John" were to move his orientation control 350a to point towards "Sam's" user space 320d, the implementing system can use this change in orientation state to enlarge "Sam's" user space 320d and diminish the size of "Mary's" user space 320b.

For example, assume that Rij represents the relative orientation of other users j with respect to a central user i, coded into three zones (e.g., 1="front", 2="side", 3="back"), and user spaces for other users j have three display sizes, Sj, with Sj=1 being a normal size. Then simply directly map Sj to Rij (e.g., if Rij=2, the size Sj of user j's user space would be set to 2). This algorithm can be extended to more or fewer reductions in user space size as orientation changes.

In another variation, the apparent size of display spaces may be based on the mutual orientation of two users rather than just the central user's orientation. That is, apparent size may depend not only on how a first user is oriented towards a second user, but how the second user is oriented towards the first user. For example, assume that Rij represents the relative mutual orientation of other users j with respect to a central user i, coded into nine zones, and user spaces for other users j have four display sizes, Sj, with Sj=1 being a normal size. A lookup table can be used to map Sj to various values of Rij. For example, the cell entries of Table 1 below could be used to determine the size Sj of each user j's user space 320 with respect to user i as a function of mutual orientation. Other mappings may also be used.

TABLE 1

| Orientation of user i (1 = front, 2 = side, 3 = back) | Orientation of user j (1 = front, 2 = side, 3 = back) | | |
|---|---|---|---|
| | 1 | 2 | 3 |
| 1 | 1 | 2 | 3 |
| 2 | 2 | 3 | 4 |
| 3 | 3 | 4 | 4 |

Distance and orientation can be combined to determine the display size of other users' user spaces 320. For example, the cell entries of Table 2 below could be used to determine the size Sj of each user j's user space 320 with respect to user i as a function of distance and orientation. Other mappings may also be used.

TABLE 2

| Orientation Rij (1 = front) | Distance Dij (1 = nearest) | | | |
|---|---|---|---|---|
| | 1 | 2 | 3 | 4 |
| 1 | 1 | 2 | 3 | 4 |
| 2 | 2 | 3 | 4 | 4 |
| 3 | 2 | 3 | 4 | 4 |

As should be apparent from the examples of Tables 1 and 2, distance and mutual orientation can also be combined to determine the display size of other users' user spaces 320.

Other factors may be used to determine the display size of other users' user spaces 320, such as internal and external reputation scores. Thus, for example, a distant user space 320 of a participant who has a higher reputation score may be displayed at one size larger than an equally distant user space 320 of a participant having a lower reputation score.

Content Spatial Compression

Another aspect of the invention that is particularly useful in a user-centric embodiment conserves display space and mimics the characteristics of real-world conversations by compressing the contents of other users' content areas as a function of distance and/or orientation. This aspect optionally can be combined with user space compression, described in the previous section.

Figure 9:
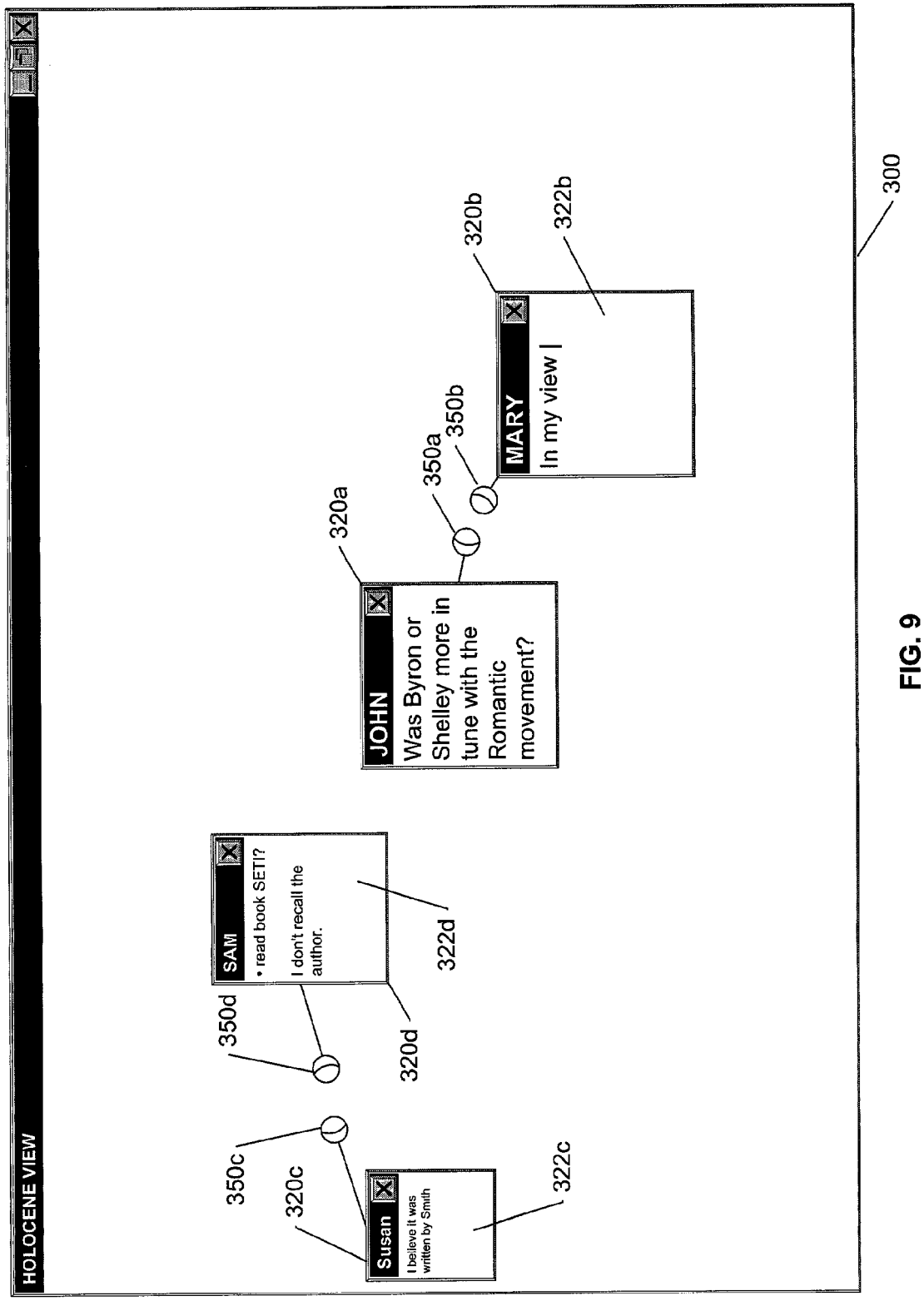
FIG. 9 is a diagram of a user-centric view showing content area compression as well as user space compression.

FIG. 9 is a diagram of a user-centric view showing content area compression as well as user space compression. Central user "John's" orientation control 350a is directed towards "Mary's" user space 320b, which is also relatively close to "John's" user space 320a. Accordingly, "Mary's" user space 320b is shown full size, and no compression is shown of the text in "Mary's" content area 322b.

However, the implementing system can recognize that, based on the coordinates of the user spaces 320a, 320d for "John" and "Sam" and the direction of attention of "John's" orientation control 350a, "Sam's" user space 320d is "behind" "John's" user space 320a. Accordingly, "Sam's" user space 320d can be reduced in size (as described in the previous section) and/or part or all of the content in the content area 322d for "Sam's" user space 320d can be compressed. In particular, a number of different forms of "spatial compression" can be applied.

"Spatial compression" comprises any of several techniques for reducing the size-related perception attributes of the contents of a user space without substantially altering the information depicted by such content. Such techniques include: changing the weighting of a typeface from heavy to light; changing all-capitalized text to sentence case or lower case; changing from a serif typeface to a sans serif typeface; reducing the point size of a typeface; and reducing line separation and/or inter-word separation. Other "shrinking" techniques may also be used. In particular, spatial compression can be extended to non-text elements, such as graphics. For example, a graphic element can be replaced with a smaller "thumbnail" version or deleted entirely as a function of distance or orientation.

One example of an application of some of these techniques is shown in FIG. 9, in which the typeface of the text in the content area 322d for user "Sam" is reduced in point size because "Sam's" user space 320d is "behind" central user "John's" user space 320a. Similarly, the typeface of the text in the content area 322c for user "Susan" is further reduced in point size because "Susan's" user space 320c is "behind" central user "John's" user space 320a and further away than "Sam's" user space 320d.

A number of spatial compression techniques can be combined. For example, as the distance Dij between user i's user space to some other user j's user space increases (e.g., measured in five zones so that 1="adjacent" and 5="very distant"), the following algorithm can be applied:

If Dij=1, no compression;

If Dij=2, change all words in bold type to regular text;

If Dij=3, change the typeface to a sans serif lightweight typeface;

If Dij=4, change the typeface to a smaller point size (e.g., from 12 point to 10 point) and/or reduce line separation. If it is now possible to combine two lines into one line, do so.

If Dij=5, change the typeface to a smaller point size (e.g., from 10 point to 8 point) and/or reduce line separation. If it is now possible to combine two lines into one line, do so.

This algorithm can be extended to more or fewer reductions in content size as distance increases.

A similar algorithm can be applied based on orientation. For example, if Rij represents the relative orientation of other users j with respect to a central user i, coded into three zones (e.g., 1="front", 2="side", 3="back"), the following algorithm can be used:

If Rij=1, no compression;

If Rij=2, change all words in bold type to regular text, and change the typeface to a sans serif lightweight typeface;

If Rij=4, change the typeface to a smaller point size (e.g., from 12 point to 10 point) and/or reduce line separation. If it is now possible to combine two lines into one line, do so.

This algorithm can be extended to more or fewer reductions in content size as orientation changes.

As with user space compression, spatial compression can be based on both distance Dij and orientation Rij (either central user orientation or mutual orientation). A lookup table mapping these two variables to various compression actions can be constructed in a manner similar to Tables 1 and 2 above. Alternatively, various compression actions may be determined by combining these two variables (alone or with other variables) using a mathematical algorithm.

Spatial compression also can work in reverse as movement occurs among the participants within a conversation display space. That is, as the distance between a central user and a more distant user lessens, or as the direction of attention of the central user changes to a more "direct" view, previously spatially compressed content can be expanded (for example, by applying the spatial compression algorithm in reverse). This is an extension of the characteristics of natural spoken conversations, in that the history of prior conversations can be "resurrected" for review by a user as that user gets closer to or more focused on other users.

Content Compression by Selective Filtering

Another form of compression based on selective filtering can also be applied to further reduce the amount of screen area occupied by the contents of content areas in users' user spaces. Human ears are very good at picking out sounds or words of specific interest to the individual listener, and ignoring all the rest. A system implementing HCM can emulate this facility by selectively filtering or removing words in reverse order of priority as a function of distance or orientation.

Such "content compression" is illustrated in part in FIG. 9, where the top-most line in the content area 322d of user "Sam's" user space 320d has been reduced from "Has anyone read the new book on SETI?" (see FIG. 5A) to "* read book SETI?". In this example, a preceding asterisk has been added to indicate to other users that the adjacent line has been content compressed. The question mark has also been preserved in this embodiment, since it indicates a question rather than a statement, and thus imparts important semantic content.

Selective filtering content compression is applied to text preferentially in user spaces 320 farther from the central user or behind or to one side of the central user's chosen direction of attention. Selective filtering content compression may also be applied to text preferentially in user spaces 320 that have internal and/or external reputation scores below a selected threshold. Selective filtering emulates the way people pay closer attention to speakers they are facing, and/or who are closer, and/or who have a higher reputation. This effect works well in conjunction with user space compression, since more distant user spaces are themselves made smaller until, near the edge of the display screen or conversation display space, they may contain only a few key words. Spatial compression of content area text can also be applied to "shrink" the displayed size of content-compressed text and other user input (e.g., graphics).

A number of different algorithms and techniques may be applied to achieve content compression. These include word removal or substitution based on a system-wide list; word removal or substitution based on a user defined list; abbreviation of words or phrases (e.g., "BTW" for "by the way"); and lossless and/or lossy compression of graphics. Other content compression techniques may also be applied.

A number of content compression techniques can be combined. For example, one such algorithm might include some or all of the following steps applied as a function of distance Dij or orientation Rij of other users j with respect to each user i:

Step 1—Do not display articles (i.e., "a", "an", "the") and connecting words (e.g., "and", "or") of little information value and/or replace them with abbreviations (e.g., "&" instead of "and"), unless on user i's key word list (see, e.g., FIG. 4A).

Step 2—Do not display weak adjectives and qualifiers (e.g., "blue"), or else replace them with abbreviations (e.g., substitute "st." for "state" or "street") or shorter synonyms (unless on user i's key word list).

Step 3—Do not display strong adjectives and adverbs (e.g., "rapidly"), or replace them with abbreviations or shorter synonyms (unless on user i's key word list).

Step 4—Simplify verbs or replace them with abbreviations or shorter synonyms (unless on user i's key word list).

Step 5—Simplify nouns or replace them with abbreviations or shorter synonyms (unless on user i's key word list).

Step 6—Do not display any words not on the user's key word list.

The system implementing HCM may contain a system-wide or a forum-wide dictionary or look-up table of pre-defined words (e.g., in a hash table) against which the words in particular content areas of other users could be compared at each step. Comparison may be by simple string comparison techniques. This algorithm can be extended to more, fewer, or different steps as proximity or orientation changes.

A variant of content compression by selective filtering is use of intelligent software to interpret the "gist" of what a speaker has said. For example, a lengthy and convoluted reply may boil down to "User A agrees with User B". An example of one type of such software is the "autosummarize" function of Microsoft Word®.

Content compression can also work in reverse, and become content expansion, as movement occurs among the participants within a conversation display space 300. That is, as the distance between a central user and a more distant user lessens, or as the direction of attention of the central user changes to a more "direct" view, previously compressed content can be expanded (e.g., by restoring more and more of +he original input from another user's conversation content table, such as is shown in FIG. 4B). This is an extension of the characteristics of natural spoken conversations, in that the history of prior conversations can be "resurrected" for review by a user as that user gets closer to or more focused on other users.

Compression as a Function of Ageing

Another aspect of the invention takes advantage of the fact that each user's input can be time stamped. Accordingly, in addition to applying compression as a function of distance and/or orientation, user space compression, spatial compression, and/or content compression can be performed as a function of time.

Figure 10:
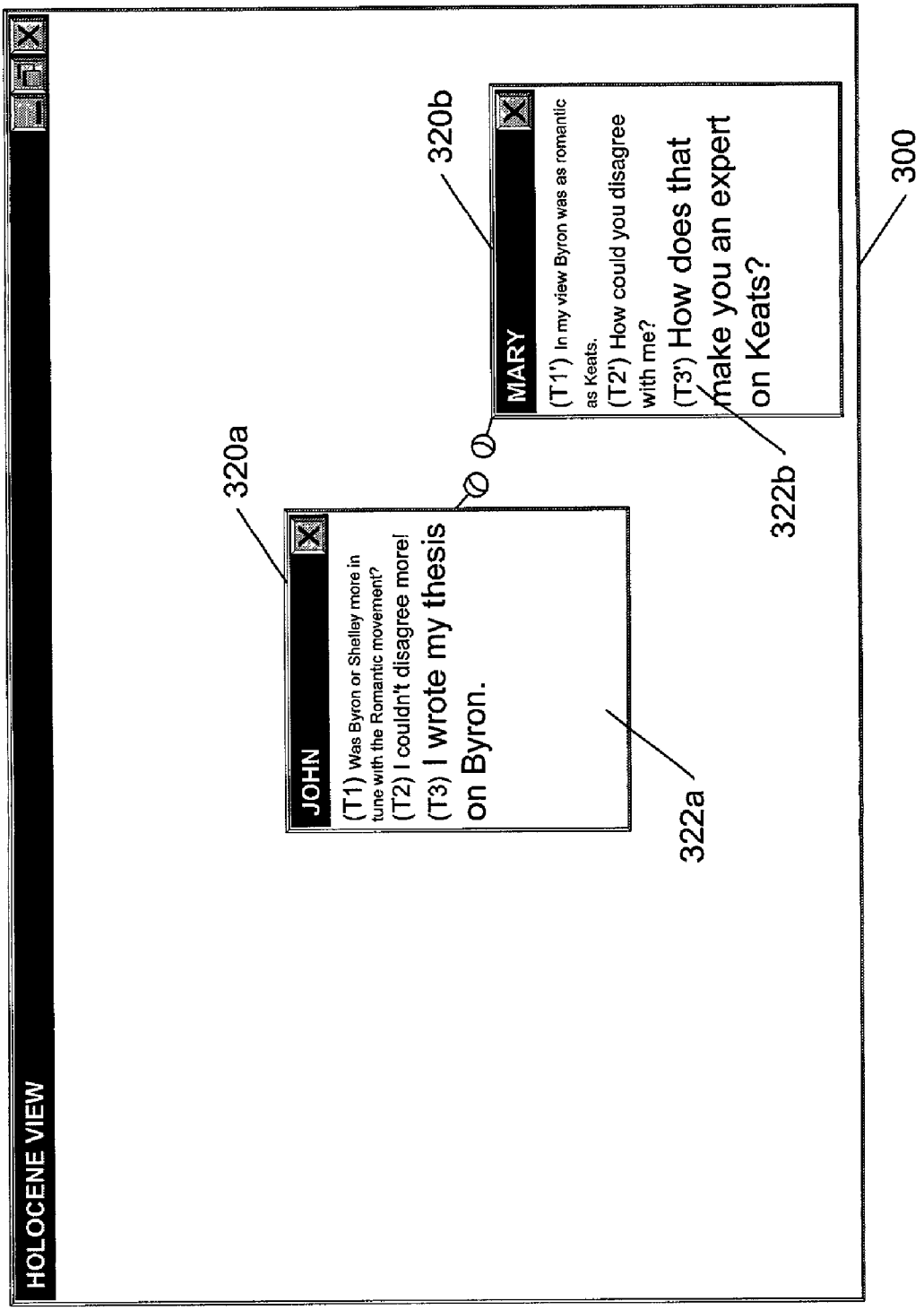
FIG. 10 is a diagram showing a conversation between two users.

FIG. 10 is a diagram showing a conversation between two users, "John" and "Mary". Each sentence entered by both participants is shown flagged, for convenience of explanation, with a relative time stamp (i.e., T1, T2, T3 for "John", T1', T2', T3' for "Mary"); these flags may not be displayed in an actual implementation. As noted above, each time-stamped entry (word, line, sentence, etc., depending on implementation) into a user's content area 322a, 322b is stored in a conversation content table (see FIG. 4B). In order to make more text (and thus context) visible within each user's user space while allowing more user spaces to be displayed within a conversation display space, "older" (earlier entered) content can be compressed by applying spatial or content compression.

In the example shown in FIG. 10, simple spatial compression by font size reduction has been used to decrease the display size of older text. In particular, the earliest entered text (at T1, T1') for both speakers is shown in 6 point type, the next earliest (at T2, T2') in 8 point type, and the most recent (at T3, T3') in 12 point type. The trigger for size reduction of any particular text entry can be, for example, input of a new text entry, or elapse of time, or both. Content compression can also be applied, as described above, using the same or other triggers. In such case, as each user adds text, older text scrolls upwards within the user's user space. As the text scrolls upward, selective filtering takes effect, so that the oldest entries are shortened.

User space compression can also be applied, typically triggered by elapse of time. Thus, if a user has stopped inputting text or other content, the entire entered content will age and be reduced in size. Further, the user's user space can be compressed in size as well, expanding only when the user again enters new text.

Various algorithms can be applied to implement compression as a function of ageing. One algorithm would be to reduce each previously entered text line or sentence by one point when each new line or sentence is entered, stopping at a minimum display size (e.g., 6 points). Another algorithm would be to reduce each previously entered text line or sentence by one point for every period of elapsed time (e.g., 20 seconds) it has been displayed, again stopping at a minimum display size. A third algorithm would combine and extend the first two algorithms: all prior lines are reduced one point as each new line is entered, and if no new line has been entered within a period of elapsed time, all prior lines are reduced by one point (in all cases stopping at a minimum display size); thereafter, content compression is performed on the most spatially compressed lines.

Compression as a function of aging can be combined with compression as a function of proximity and orientation. A lookup table mapping these three variables to various compression actions can be constructed in a manner similar to Tables 1 and 2 above. For example, user spaces farther away from or outside the direction of attention of a central user may be "aged" faster than closer user spaces. Thus, user space compression, spatial compression, and content compression can be applied at a faster rate to more distant user spaces. Ageing can also be extended to non-text elements, such as graphics. For example, a graphic element can be replaced with a smaller "thumbnail" version or deleted entirely as a function of time.

Selective Flagging

Another aspect of the invention is a different form of selective filtering, which might be termed "selective flagging", since it is not typically applied just to compress content (although it may be used for that purpose). Rather, selective flagging typically is used to draw attention to specific content of other users or to users having specific characteristics (e.g., in terms of topics, importance, or reputation).

Selective Flagging Based on Emphasis

One aspect of the invention uses the emphasis added by other users to retard or restrict selective filtering (content compression), to draw attention to those users. Whether or not text is emphasized can be determined by examining the perception attributes stored in each user's conversation content table (see FIG. 4B).

For example, if another user emphasizes input text by applying bolding or italics, any operational content compression algorithms can be restricted to not eliminate the emphasized text. Similarly, any operational spatial compression algorithm can be restricted to not remove the emphasis. In another implementation, compression is retarded rather than restricted, so that a line or sentence of text, for example, must age longer before any emphasis is removed. In any case, the central user can scan all displayed user spaces within a conversation display space and visually detect any retained emphasis.

Selective flagging based on emphasis can also be used to enhance the emphasis added by other users to their text content. Any desired perception attribute can be used to flag a selected speaker. For example, a system implementing HCM can cause emphasized text (e.g., bold text) to blink or flash, in the original or a new color, thereby drawing attention to the text. Alternatively, perception attributes of a user space 320 containing such emphasized text can be altered, such as by changing its border color. This feature is particularly useful if the emphasis is applied with respect to text in a user space 320 at some distance to a central user, or outside of the central user's direction of attention. An extension of this feature is to cause icons in a world view representation of the conversation display space 300 to flash or otherwise signal a flagged user space 320. Alternatively, the central user may be notified in any desired fashion of the location of a user space 320 containing emphasized content (e.g., by paging, as described below).

This form of selective flagging may also be used in reverse, to speed up compression. For example, typing in all capital letters (LIKE THIS) is considered by many chat room users to be shouting, and hence rude. Accordingly, a system implementing HCM can allow a user to define such emphasized text as a trigger for speeding up compression (e.g., by assigning a negative weight).

Selective Flagging Based on Comparison Terms

Another aspect of the invention is another version of selective flagging based on a user's key word list, list of importance terms, and/or topics list (collectively and more generally, "comparison terms"). Whereas selective flagging based on emphasis utilizes the perception attributes added by another speaker to flag content of interest, this form of selective flagging generally is based on using the words or terms defined by a user (see FIG. 4A) in a "positive" manner to flag content or speakers or topics of interest. However, this form of selective filtering may be also used in a "negative" fashion by using filter terms to suppress or censor conversations (e.g., suppressing display of conversations that contain profanities).

Although one list of defined comparison terms could be used in some embodiments, maintaining separate key words, importance terms, and topics can be useful. For example, key words normally would be compared against the content entered by other users. Importance terms can be compared independently against "meta" information, such as another user's identification or profile data that may contain, for example, a user's real name (as opposed to screen name), gender, interests, educational and personal background, etc. This distinction is useful, for instance, in distinguishing conversations about a person from conversations by that person. Further, a user's topics list can be compared against a current topic of another speaker.

This aspect of the invention can be applied to retard or restrict selective filtering (content compression), or to draw attention to users or content that match the central user's key word, importance terms, or topics. For example, if another user's identification or content matches an importance term or key word defined by the central user, any operational content compression algorithms can be restricted to not eliminate that users' text. Similarly, any operational spatial compression algorithm can be restricted to not apply to that users' text. In another implementation, compression is retarded rather than restricted, so that a line or sentence of text must age longer before being compressed. Thus, the central user will be able to see more of the content of flagged user spaces compared to unflagged user spaces.

This form of selective flagging can also be used to positively notify a user of the presence of user spaces that match a key word or importance term. Any desired indicator of a match can be used. For example, any desired perception attribute can be used to flag the content of a matching user space. Alternatively, perception attributes of the matching user space itself can be altered, such as by changing its border color. For example, a system implementing HCM can cause a user space 320 containing matching content or "meta" information to blink or flash, thereby drawing attention to them. An extension of this feature is to cause icons in a world view representation of the conversation display space 300 to flash or otherwise signal a flagged user space. Alternatively, the central user may be notified in any desired fashion of the location of a user space 320 containing matching content or "meta" information.

As noted above with respect to FIG. 4A, both key words and importance terms can have optional weighting factors (this concept can be extended to topics and similar terms as well). Such weights may be used, for example, to determine the amount of emphasis given to matches. For example, if a user lists "oil" with a weight of "1", and "environment" with a weight of "2", then a more prominent indicator may be used when a match is found for "environment" (e.g., both a flashing border and highlighting of content) than when "oil" is matched (e.g., only a flashing border).

This form of selective flagging may also be used in reverse, to speed up compression (this is similar to the example of censoring conversations given above, but affects the speed of compression rather than suppressing display outright). For example, a system implementing HCM can allow a user to define keywords which, when matched in other users' content, serve as a trigger for speeding up compression (e.g., by assigning a negative weight).

Selective Flagging Based on Reputation

Selective flagging may also be based on the internal and/or external reputation scores of other users. This aspect of the invention can be applied, for example, to retard or restrict selective filtering (content compression), or to draw attention to users having certain reputation scores. Any desired indicator of a match can be used. For example, any desired perception attribute can be used to flag the content of a matching user space. Alternatively, perception attributes of the matching user space itself can be altered, such as by changing its border color. Thus, for example, a user space 320 of a participant who has a higher reputation score may be displayed with a flashing border or red colored content, while the user space 320 of a participant having a lower reputation score may be displayed with default attributes (e.g., black text and a black border). Alternatively, the central user may be notified in any desired fashion of the location of a user space 320 containing matching reputation information.

This form of selective flagging may also be used in reverse, to speed up compression or to suppress display of persons having reputation scores outside the bounds of a user selectable range.

Interdependent Implementation

It should be apparent that most of the features described above may be used in various combinations. In implementing a system based on HCM, various parameters (e.g., distance and orientation) affecting the operation of these features must be defined. In addition, certain threshold values may be variable, and thus must be selected or set for each particular application. For example, a human host of a "cyberspace" forum or discussion area based on a system implementing HCM may set initial default values for certain parameters and threshold values which will determine how various independent variables (e.g., distance, orientation, time stamp values, word values) will affect dependent variables (e.g., age) and various actions (e.g., user space compression, spatial compression, content compression, selective filtering, and selective flagging). In some embodiments, users may alter these default settings within a range set by the host.

As an example, one implementation of HCM could define certain independent variables as follows:

$D_{ij}$=distance between users i and j, coded as a number (e.g., 1 to 5, with 5 being the most distant) representing, for example, either a range of absolute distances computed from the coordinates of the user spaces for users i and j, or the number of user spaces that lie between users i and j.

$R_{ij}$=the relative orientation of other users j with respect to a central user i, coded into zones (e.g., 5 zones), where those user spaces near user i's direction of attention have the lowest zone value and those 180 degrees opposite have the highest zone value.

$T_i$=the time stamp value for each text fragment (e.g., word, sentence, line) assigned to input in user i's user space. From the time stamp values for each user i, a dependent ageing variable, $A_{ij}$, can be computed, coded as a number (e.g., 1 to 10, with 10 being the oldest with respect to a current time point) representing the age of a text fragment in user j's user space with respect to user i (note that i=j is allowed, in order to age a user's own input). As another alternative, $A_i$ can be defined as a coded value representing the age of a text fragment in user i's user space 320 with respect to current time (e.g., 1="less than 30 seconds old", 2="30–60 seconds old, etc.). As another alternative, line numbers can be used to track the relative age of input, with lower numbers indicating input from earlier in a session. A variant of this technique is to track only line numbers of text currently displayed in each user space.

$W_{ik}$=a word value score assigned to k words, comprising pre-defined application-wide words and each word in user i's key word list and list of importance terms. This value measures the word's likely relevance to the user. A high numerical value of Wik for word k means the word has high priority and should be eliminated later in content compression. A low value of Wik for word k means the word has low priority and should be eliminated earlier in content compression.

Increasing values of Dij, Rij, and Aij (or "older" values of Ti) indicate that various forms of compression can be applied. In this example embodiment, these variables can be combined in a linear or non-linear manner to generate a composite score, Xij, indicating whether the content and/or user space of user j should be compressed with respect to user i. The composite score may be compared to pre-set threshold values to determine the appropriate action to take. Whenever the composite score exceeds each threshold, certain actions are triggered that affect a user space. The following examples indicate actions that may be taken for the user space of user j when the composite score exceeds defined thresholds with respect to user i:

When X>4, change all words in bold type to plain text.

When X>6, reduce the typeface of all text fragments having an age greater than 1 by one point and reduce line separation accordingly. If it is now possible to combine two lines into one, do so. Remove blue highlights, and change red highlights to blue. If the vertical height of the text is less than the display height of the content area for the next smallest user space size, reduce the user space size.

When X>10, reduce the typeface of all text fragments having an age greater than 1 by one point, and having an age greater than 3 by two points, and reduce line separation accordingly. If it is now possible to combine two lines into one, do so. Begin selective word filtering, removing all words with priority values of 2 or lower. Abbreviate (if possible) all words with values of 4 or lower. Highlight in flashing blue those words with values of 12 or higher.

As should be apparent, other combinations of the available variables can be made, and different threshold values and resulting actions defined. Further, different functions of each variable can be defined and then combined in different ways. For example, a human host of a forum can define such functions and their combination for a particular forum. Alternatively, the functions and/or the "combining function" may be determined automatically (e.g., the functions may change with the number of participants in a forum).

Figure 11:
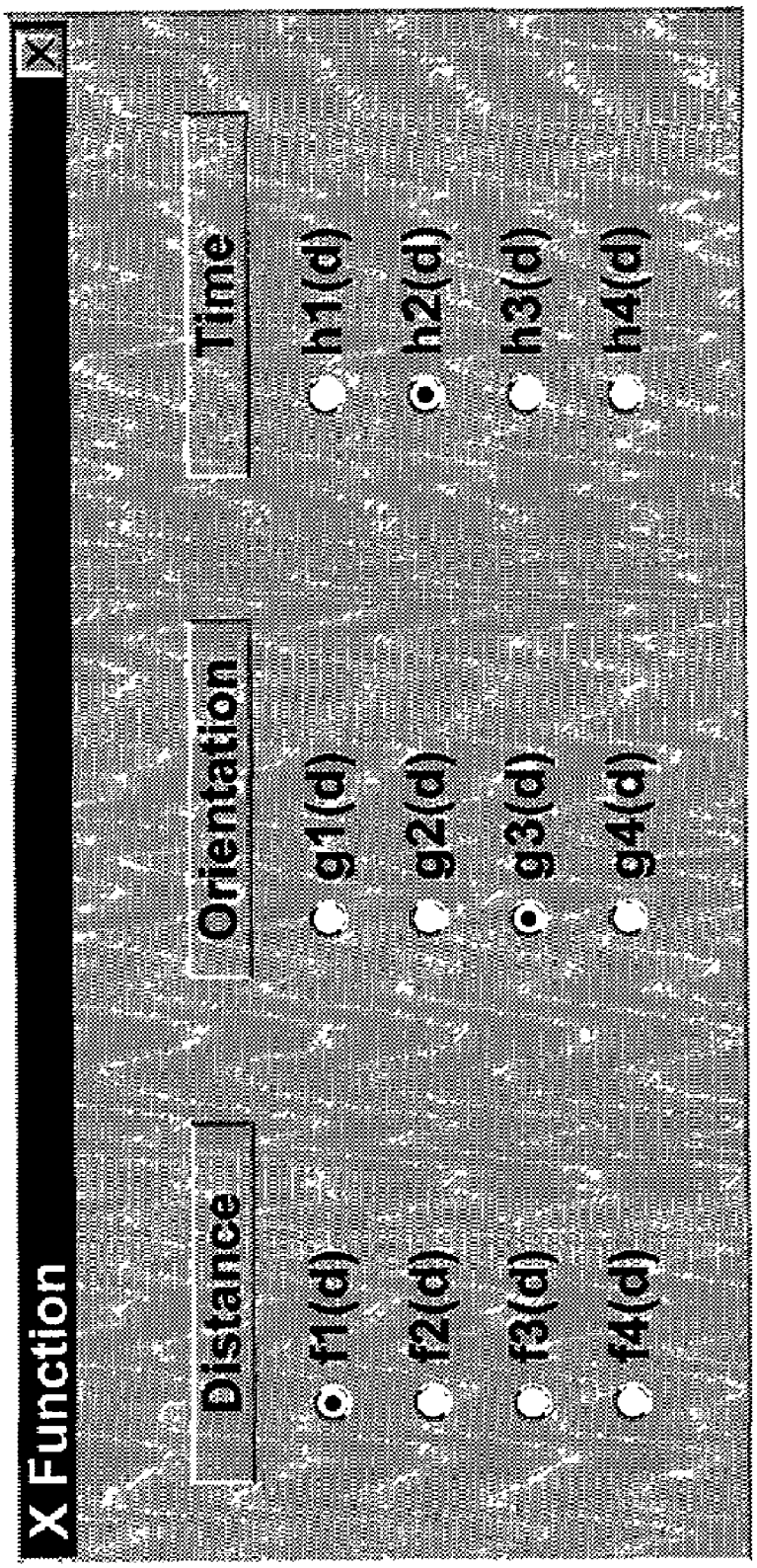
FIG. 11 is a diagram of a control dialog that allows a user to select various combinations of functions to apply during a forum session.

As another alternative, each user may be allowed to select their own set of operational functions. For example, FIG. 11 is a diagram of a control dialog that allows a user to select various combinations of functions to apply during a forum session. In the illustrated example, a user can select one of four distance functions $f_n(d)$, orientation functions $g_n(r)$, and time or ageing functions $h_n(t)$. The distance functions may provide, for example, different numbers and/or sizes of distance zones. The orientation functions may provide for different definitions, such as 2, 4, 6, or 8 zones arrayed radially around the user's user space 320. The time functions may provide different ageing characteristics, such as from slow to fast. The functions selected by a suer may be combined in a linear or non-linear way to generate a composite score, such as the Xij function described above.

Transcript Mode

Figure 12:
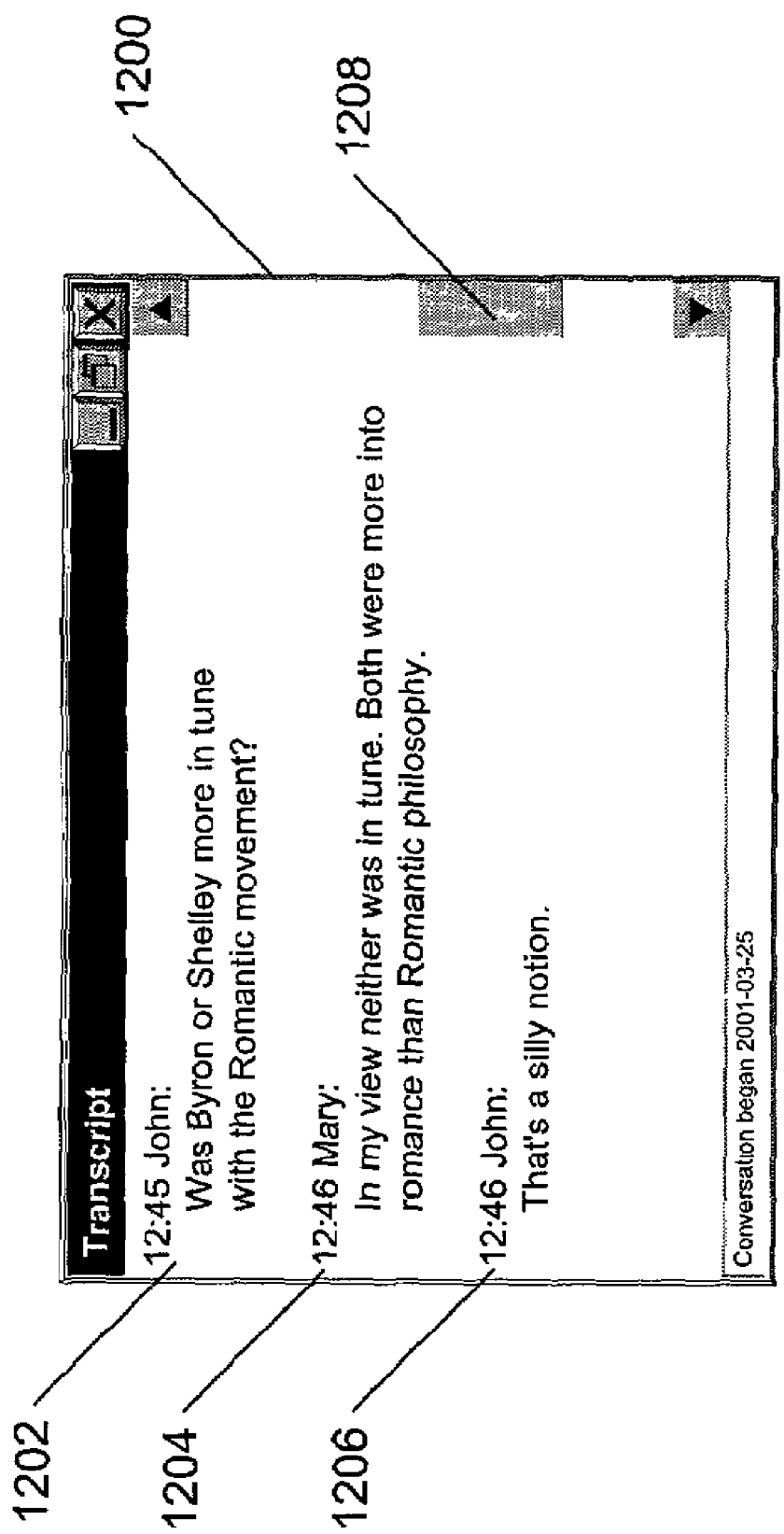
FIG. 12 is a diagram of a conversation transcript.

A useful feature of the invention is the ability to create "transcripts" of conversations. For example, users "John" and "Mary" may wish to have an interleaved rendition of their mutual conversation. Since each entry into their respective user space is time stamped, it is straightforward to retrieve their inputs from their respective conversation content tables (see FIG. 4B) and display them in a marked, chronologically interleaved manner. FIG. 12 is a diagram of a conversation transcript. A display window 1200 depicts three interleaved text entries 1202–1206 marked by speaker and time. A scroll bar 1208 is provided to allow longer transcripts to be reviewed, in conventional manner. A user may save a transcript for later review, printout, emailing, etc.

In some host environments, it may be permitted for a user who is not part of a particular conversation to nevertheless select a group of other users—either on the user's personal screen or in the larger-scale world view—and request a transcript of what is (or was) said by members of the selected group. A host server may provide a service that notifies such a group that an outsider wishes to eavesdrop, lurk, listen, or create a transcript. Further, a host server may enable such groups to disallow or block such eavesdropping, listening, or transcription by outsiders.

Merging of User Spaces

In addition to, or in lieu of transcription, two or more users may elect to merge their user spaces into a unified conversation space, creating, in effect, a running transcript of their conversations comprising interleaved comments by different users, each identified by some unique iconic or symbolic representation. In one implementation, a set of users could recreate the manner of "chatting" that they were familiar with from old-fashioned chat rooms. Outsiders who wish to merge with such a group may be required to ask permission of those already participating in the merged space.

Kiosks

Figure 13:
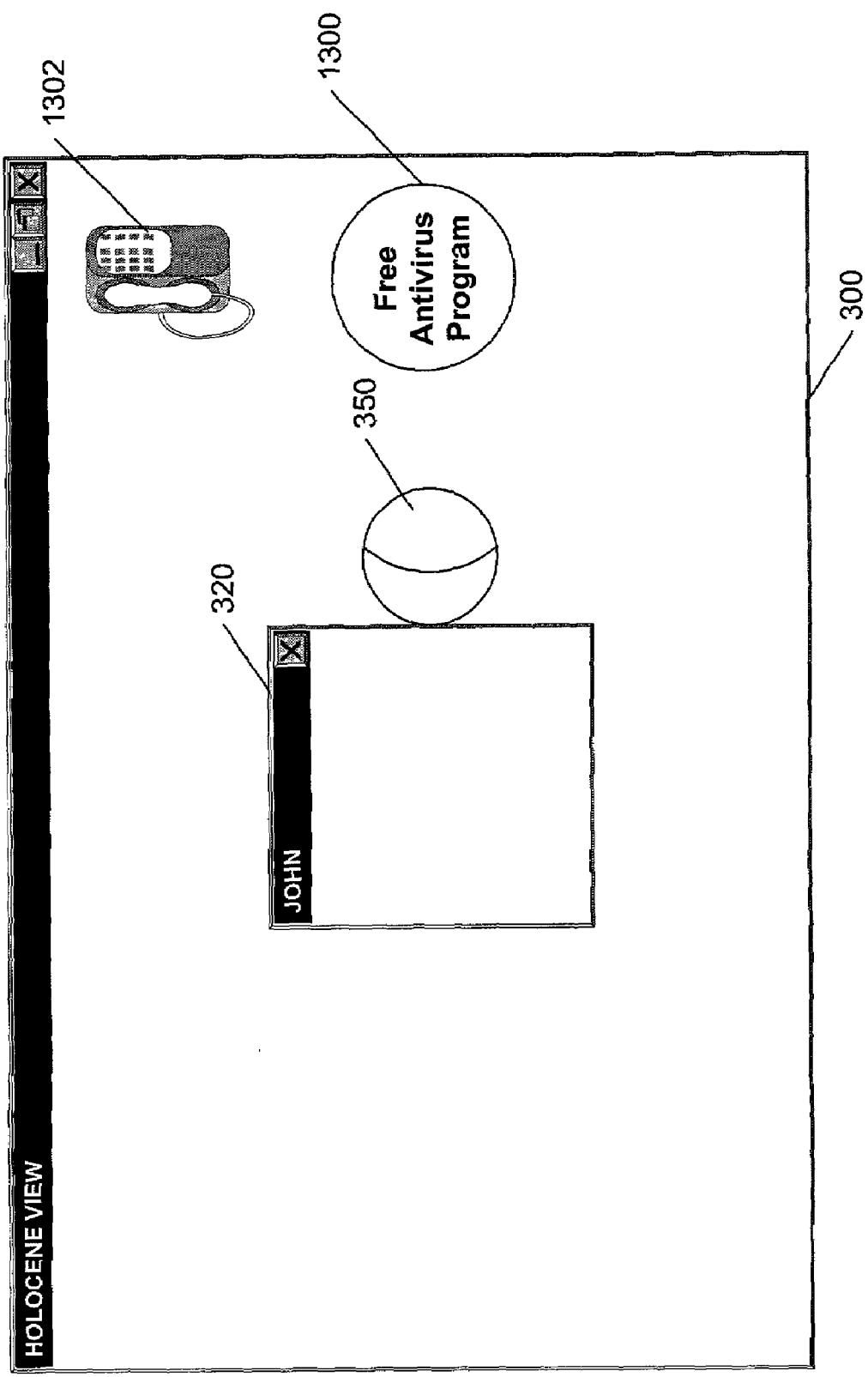
FIG. 13 is a diagram of a conversation display space in which the user space for one user is near and focused on a kiosk.

As noted above, HCM supports "kiosks", in which users can interact with non-human information sources or resources or activity centers, typically displayed in a graphical or iconic manner in a conversation display space 300. Kiosks may provide, for example, a service, function, information, object, or other form of interaction. For exam-ple, FIG. 13 is a conversation display space 300 in which the user space 320 for one user, "John", is near and focused on a kiosk 1300 that is advertising an object that may be downloaded (in the illustrated example, a free software program). By moving his user space 320 near the kiosk 1300 and activating an appropriate control or command (e.g., from a right-click menu), "John" can initiate a download of the offered program in con-ventional fashion. The transfer function can also be initiated in other manners, such as by "bumping" the user's user space 320 or orientation control 350 against the kiosk 1300, or "hovering" the user space 320 over the kiosk 1300. Other kiosk functions can be indi-cated using various types of shapes or icons; for example, a "web" phone kiosk 1302 is shown depicted by a telephone icon.

Similarly, a user may upload an object from a user space to a kiosk, such as an image that the user wishes to have converted to a different format or rendered in a different fashion (e.g., printed on quality photographic paper and mailed back).

Kiosks can be used for other purposes, such as posting persistent notes (e.g., so that they may be read by other users in a forum when the poster logs off the forum) or offering telecommunication services (e.g., a web phone, text messaging to cell phones, radio paging, etc.). As another example, "touching" or activating a kiosk may trigger the appearance of a web page, such as one offering information or items for sale, or a personal site or profile, or access to a web-based information search engine. A kiosk may also serve as a teleportation site or an exit from a current user space 320, offering, for example, "transit" to another portion of the same conversation display universe, or to a different conversation display universe, or to a web site or another program.

Object Transference

A system implementing HCM can allow transference of objects (e.g., a symbol, token, or file) between users, similar to the interactions noted above for kiosks. In one embodiment, when a central user's user space is near and focused on another user's user space, the central user can give or send an object to the other user by activating a suitable control (e.g., a "send to" command on a right-click menu). For example, one user can pass a "smiley face" icon to another user as a token of friendship. Alternatively, the central user can allow the other user to take an object from the central user (the other user would activate a suitable control). The transfer function can also be initiated in other manners, such as by "bumping" the central user's user space (or orientation control) against the other user's user space (or orientation control), or "hovering" the central user's user space over the other user's user space.

This aspect of the invention may be particularly useful in a game-oriented implementation of HCM. Users can move around a conversation display space 300 that also defines a "playing field" and give, take, or exchange objects with other players. The objects can be used for a variety of actions, such as opening "locked" areas of the conversation display space 300 or acquiring "tools" useful for solving puzzles presented by kiosks.

Alternative Embodiments

Figure 14:
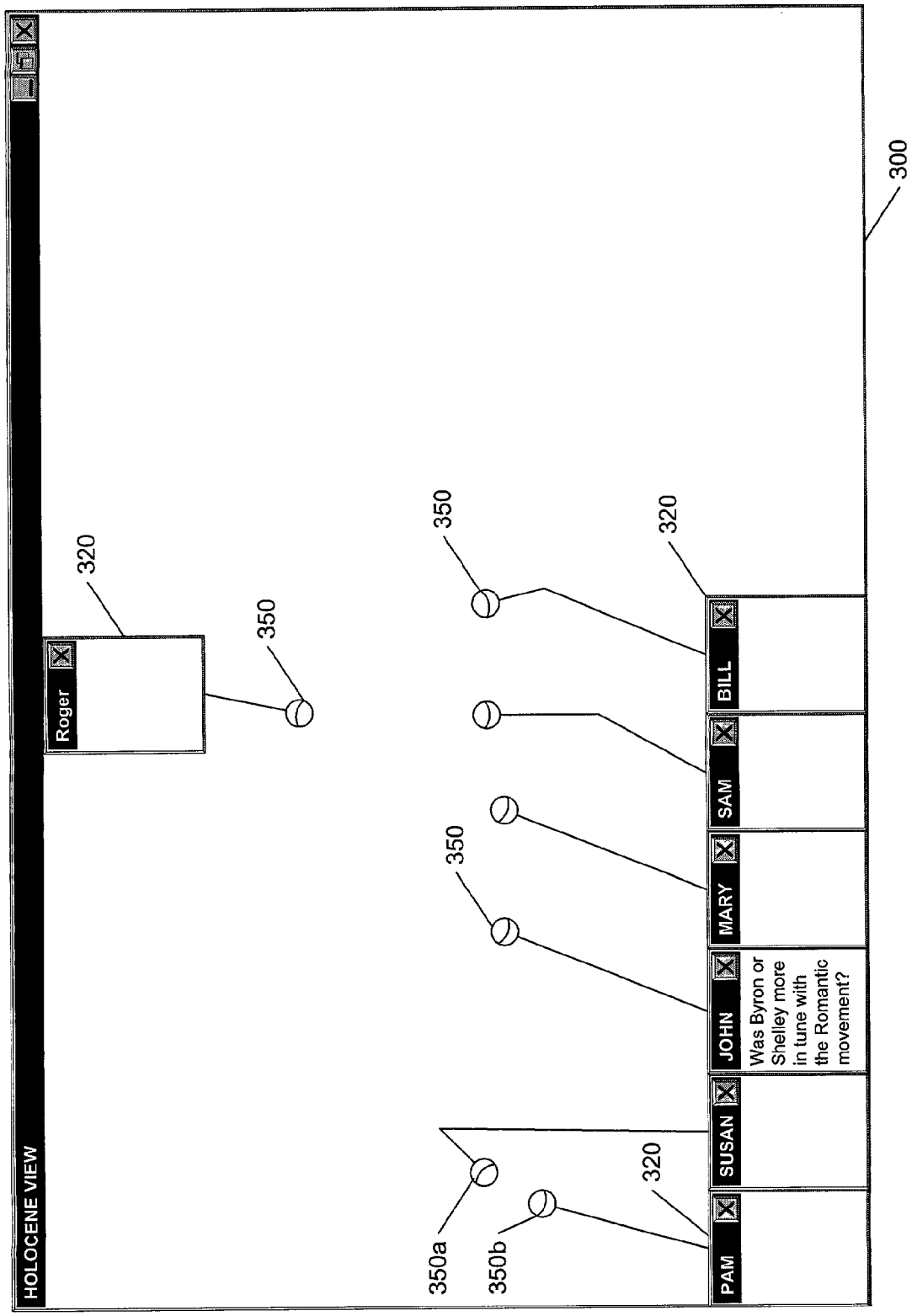
FIG. 14 is a diagram showing an embodiment of the invention in which all user spaces are docked along the edges of a conversation display space, and only the associated orientation controls are moved and reoriented.

A number of alternative embodiments of HCM can be implemented. For example, FIG. 14 is a diagram showing an alternative embodiment of the invention in which all user spaces 320 are docked along the edges of a conversation display space 300, and only the associated orientation controls 350 are moved and reoriented (in this example, the orientation controls 350 are "articulated", so that the can bend at one or more points, and proximity can be defined as the distance between orientation controls 350). This embodiment may be useful, for example, in a moderated discussion or presentation, in which most participants are focused on a small number of speakers ("Roger", in the illustrated embodiment). Other users can ask questions (as "John" is doing), or hold side conversations, open or private (as "Pam" and "Susan" are about to do in this example by positioning their respective orientation controls 350a, 350b).

Figure 15:
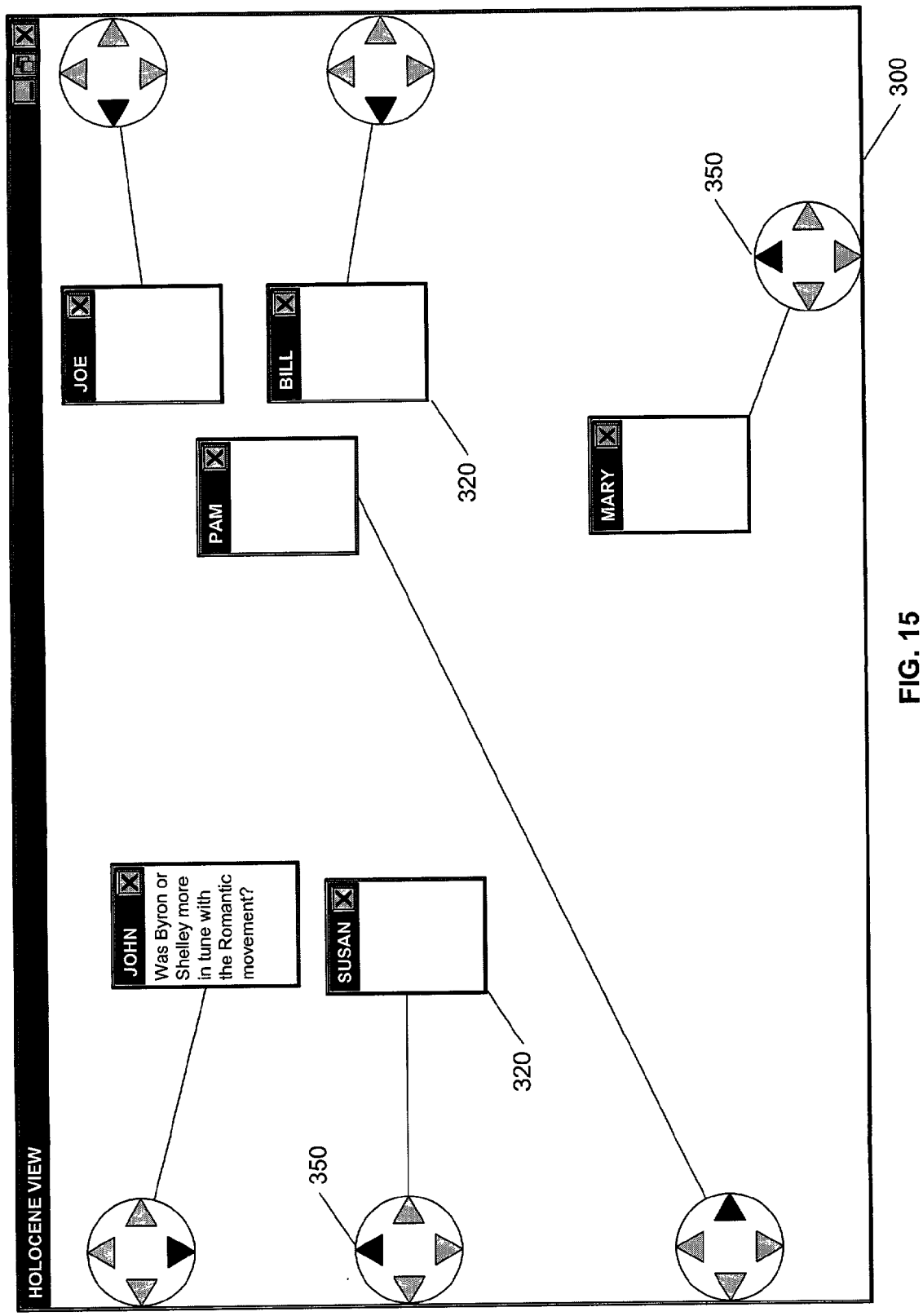
FIG. 15 is a diagram showing an embodiment of the invention in which all orientation controls are docked along the edges of a conversation display space, and only the user spaces are moved.

FIG. 15 is a diagram showing another embodiment of the invention in which all orientation controls 350 are docked along the edges of a conversation display space 300, and only the user spaces 320 are moved. In this example, each orientation control 350 shows the direction of attention by a darkened quadrant arrow, and proximity can be defined as the distance between user spaces 320.

Figure 16:
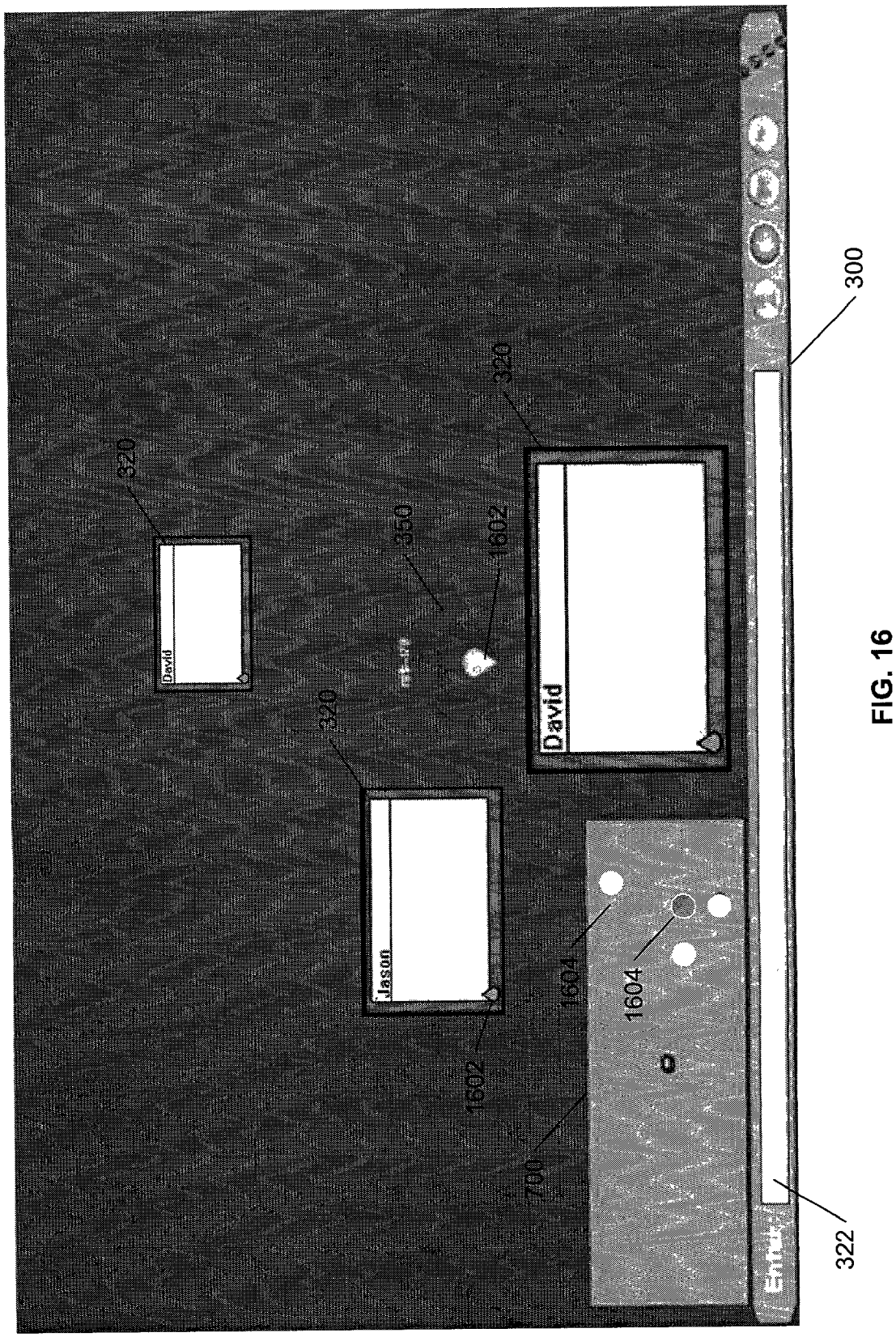
FIG. 16 is a screen shot of another embodiment of the invention in which several user spaces are shown arrayed around a central user's orientation control within a conversation display space.

FIG. 16 is a screen shot of another embodiment of the invention in which several user spaces 320 are shown arrayed around a central user's orientation control 350 within a conversation display space 300. A graphical "tear drop" indicator 1602 associated with each orientation control 350 and user space 320 shows the current orientation of each participant. In this embodiment, the central user enters information in a content area 322 located at the bottom of the screen, to conserve screen space. A world view 700 of the conversation display is also shown, indicating with circles 1604 the relative locations of the four participants displayed in the conversation display space 300.

As should be apparent, a number of possible geometrical schemes may be used to depict user spaces 320 and how they interact with each other. A typical depiction is the non-linear, symmetrical, two-dimensional implementation portrayed in FIG. 9, utilizing screen-warping to reduce the apparent size of more distant user spaces, enabling more user spaces to fit along the boundaries of a user's limited view of a current conversation display space 300. Other implementations may include three-dimensional depictions of user spaces 320 that have the appearance of height, width, and depth along with visual rendering to emulate real physical objects (e.g., billboard signs, notebooks, newspapers, etc.).

In alternative implementations, the conversation display space 300 may be graphically depicted as an "auditorium", "stadium", "arena", "stage", or the like. Preferably, the conversation display space 300 is "skinnable", so that a host or a user can vary the graphical depiction at will. In such alternative implementations, various users may find their respective user spaces 320 arrayed in fixed "geometric" positions in order to maximize the visibility of the user space 320 of a particular speaker, such as a performer or lecturer.

Any of these various graphical and "geometric" schemes may be used exclusively within a host space, or the host may chose to vary the "landscape" of a conversation display space 300 by allowing users to move from one local geometrical arrangement to another. Indeed, the geometrical rules of a particular local region within a conversation display space 300 may be conditional. That is, such rules may change depending on the needs of users present in a region or depending upon the number of users who gather in a region. For example, when a large number of users gather in close proximity, perhaps attracted by an interesting topic or a user with high reputation values, the resulting crowd of user spaces 320 may create congestion or interference of one or more perceptual traits. Accordingly, one embodiment of the invention may offer hosts a number of alternate geometry services that would enable users to avoid such interference or congestion.

For example, when some number of users (e.g., 6 or more) try to cluster close together, aiming their direction of attention vectors at one individual speaker, the system can detect the number of users and their relative proximities, and automatically impose an "amphitheater" or "auditorium" geometry on the group of participants, with the focus or "podium" position given to the speaker receiving the greatest amount of attention. Alternatively, denizens of a crowded area may be presented with various geometrical solutions to local overcrowding and invited to vote among these options (e.g., "form an amphitheater" or "form a theater in the round") and which user's user space will be given the podium position. In such group geometries, the moderator and guest user(s) may be displayed in an enhanced manner to all participants while the perceived presence of other users (i.e., the audience) is diminished.

Optional Features

In a system implementing HCM, application of the following optional rules and behavioral settings may be controlled by a host in order to create an environment better tailored to the needs of particular users.

1) A user may or may not be allowed to move between two user spaces whose orientation controls are aimed directly at each other.

2) User spaces may or may not be allowed to overlap.

3) User spaces 320 may be bordered or borderless.

4) The system may or may not be set so that the user's user space is collapsed to a small icon or symbol having an indicator of the user's last direction of attention when a participant is not "speaking", or has not spoken for a set period of time.

5) A "whisper" mode may or may not be allowed. If allowed, two or more direct neighbors can invoke a private "whisper" mode (e.g., by activating a suitable control). When activated, input by each user is displayed only to other members of the privacy group, as controlled by the system. Hosts may set the system to activate a whisper mode indicator showing that a private conversation is taking place. This mimics natural conversations, since people surrounding other people whispering in public know that a conversation is being held, but do not know what information is being exchanged. An example of a private conversation depicted in a "world" view is shown in FIG. 7, where a line joins users "Jane" and "Joe" and shading has been applied to their respective icons 320*i*', 320*j*'. In an alternative embodiment, the user spaces for participants in a private conversation are not displayed.

6) Users may or may not be allowed to "capture" (copy) or record the content displayed in another user's user space (such as by activating a right-click menu).

7) Users may or may not be allowed to "eavesdrop" on distant conversations. For example, if allowed, a user could indicate a conversation to monitor (e.g., by clicking on another user's user space) without having to move. In one embodiment, a temporary window would appear near the user with a readable replica of the other user's conversation. This mode is particularly useful in a world view of a forum, or when distant user spaces have been reduced to icons or other symbols. The other user may or may not be notified of the "intrusion", as selected by the host.

8) Users may or may not be allowed to move or "teleport" the user space of other users. If allowed, another user can literally be pulled into a conversation.

9) Users may or may not be allowed to have multiple user spaces (thus allowing them to be in two or more places at the same time).

10) A host may or may not allow a "meeting mode" (useful for a formal business meeting or the like). If allowed, a designated "chair" sees the contents of the user spaces of all participants, but controls which participant is to be "recognized" and allowed to "speak" to the group (i.e., have such content displayed for all to see). In one implementation, the system would display all entered content to the "chair" participant at all times. Otherwise, each other participant normally would only see their own input and the content of the "chair" participant's user space. The "chair" can "recognize" one or more other users (e.g., by clicking on their respective user spaces). The system would then provide the content of such recognized participants to all other participants. As a variant, a host may or may not allow the audience members to vary their orientation (i.e., the direction of attention for all audience members is forced to face a selected location).

11) A host may or may not allow "paging" of a user when an associated selective flag is triggered. That is, when a selective flagging event occurs relative to a user, the system will set an indicator associated with that user. The "page" indicator may be set within the user's own user space (e.g., a message in the title bar 324) or set within the conversation display space 300 (e.g., a flashing status bar 305 indicator). Alternatively, a "page" message may be sent in an "out of channel" manner (i.e., not using the conversation forum features directly), such as by telephoning, emailing, or radio paging a user to indicate that a selective flag has been triggered. Another alternative is to allow a participant to use any of these paging mechanisms to actively invite another user to join a conversation.

12) A host may or may not allow users to eliminate display of non-immediately neighboring user spaces 320, thus allowing neighboring user spaces 320 to be depicted at a larger size. This may be accomplished, for example, by allowing users to set values for distance codings and the default sizes of user spaces. Alternatively, a user may be allowed to select (e.g., by pointing and clicking) which user spaces 320 to suppress, on an ad hoc basis, or define rules for suppressing user spaces 320 (e.g., "suppress user spaces having a current topic of oil drilling").

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform the stated function. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

The accompanying appendix includes the JAVA program code for a working prototype of one embodiment of the invention.

In the implementations described above, a host system may define various rules of interaction among the user spaces 320 of various users. However, a centralized host system is not essential. For example, the invention may be implemented as a "peer-to-peer" system. In such an implementation, various users can interact with each other under representational formats that are derived ad hoc, when two or more users of an HCM system initially contact each other. Thus, two or more users can define the graphical representation of a conversation display space 300 and of user spaces 320, and the "rules of engagement" for participants.

A number of embodiments of the invention have been described. Nevertheless, it will be understood that various modifications may be made without departing from the spirit and scope of the invention. For example, a system implementing HCM can incorporate text-to-speech technology to allow use by vision-impaired users. Accordingly, other embodiments are within the scope of the following claims.

What is claimed is:

1. A method of interactive communication between a plurality of users, including:
   (a) displaying a conversation display space having at least two dimensions;
   (b) displaying a plurality of orientation controls, each having a corresponding user space, within the conversation display space;
   (c) enabling a user to move or reorient an associated orientation control relative to at least one other orientation control within the conversation display space;
   (d) enabling communication of content between at least two user spaces corresponding to such orientation controls; and
   (e) varying the size of user spaces as a function of distance between user spaces and at least one of: orientation between user spaces, the reputation of users, the time content was communicated, or the characteristics of such content.

2. The method of claim 1, wherein the conversation display space is user-centric.

3. The method of claim 1, further including enabling at least one user to add perception attributes to the user space corresponding to the orientation control associated with such user.

4. The method of claim 1, further including displaying content entered by a user in the user space corresponding to the orientation control associated with such user, and enabling such user to add perception attributes to at least some of such content.

5. The method of claim 1, further including varying the size of user spaces as a function of user centric orientation between user spaces.

6. The method of claim 1, further including varying the size of user spaces as a function of mutual orientation between user spaces.

7. The method of claim 1, further including automatically determining the reputation of each user.

8. The method of claim 1, wherein after a user space has been decreased in size, further including enabling a user to restore the size of such user space.

9. The method of claim 1, further including displaying selected amounts of content communicated by each user within the user space corresponding to the orientation control associated with such user.

10. The method of claim 9, further including selecting the amount of content displayed as a function of distance between user spaces.

11. The method of claim 9, further including selecting the amount of content displayed as a function of orientation between user spaces.

12. The method of claim 9, further including selecting the amount of content displayed as a function of the reputation of each user.

13. The method of claim 12, further including automatically determining the reputation of each user.

14. The method of claim 9, further including selecting the amount of content displayed as a function of the time such content was communicated.

15. The method of claim 9, further including selecting the amount of content displayed as a function of the time such content was communicated and as a function of characteristics of such content.

16. The method of claim 1, further including displaying content communicated by each user in the user space corresponding to the orientation control associated with such user, and applying filtering criteria to select at least one user space.

17. The method of claim 16, wherein the filtering criteria include characteristics of such content.

18. The method of claim 16, wherein the filtering criteria include comparing selected comparison terms against the content of a user space.

19. The method of claim 16, wherein the filtering criteria include comparing selected comparison terms against metadata associated with a user space.

20. The method of claim 16, wherein the filtering criteria include the reputation of a user.

21. The method of claim 16, wherein the filtering criteria include at least one perception attribute associated with the content of a user space.

22. The method of claim 16, further including changing at least one perception attribute of a user space or of the content of a user space as a result of meeting the filtering criteria.

23. The method of claim 16, further including communicating a paging indicator based as a result of meeting the filtering criteria.

24. The method of claim 1, further including enabling transfer of an object between user spaces.

25. The method of claim 1, further including enabling interaction between a user space and a kiosk.

26. The method of claim 25, wherein the interaction includes transfer of an object between the user space and the kiosk.

27. The method of claim 1, further including displaying a world view of the user spaces.

28. The method of claim 1, further including selectively suppressing display of at least one user space.

29. The method of claim 1, further including enabling a privacy mode whereby content of a user is communicated only to selected other users.

30. The method of claim 1, further including outputting a chronological interleaved transcript of content communicated among selected users.

31. The method of claim 1, further including displaying all communicated content only to at least one selected user, and enabling such at least one selected user to selectively communicate such content to selected other users.

32. The method of claim 1, wherein each orientation control is integrated with its corresponding user space.

33. A method of interactive communication between a plurality of users, including:
   (a) displaying a conversation display space having at least two dimensions;
   (b) displaying a plurality of orientation controls, each having a corresponding user space, within the conversation display space;
   (c) enabling a user to move or reorient an associated orientation control relative to at least one other orientation control within the conversation display space;
   (d) enabling communication of content between at least two user spaces corresponding to such orientation controls;
   (e) displaying content communicated by each user in the user space corresponding to the orientation control associated with such user; and
   (f) varying the size of the content of at least one user space as a function of distance between such user space and at least one of: orientation between user spaces, the reputation of users, the time content was communicated, or the characteristics of such content.

34. The method of claim 33, further including varying the size of such content as a function of user centric orientation between user spaces.

35. The method of claim 33, further including varying the size of such content as a function of mutual orientation between user spaces.

36. The method of claim 33, further including automatically determining the reputation of each user.

37. The method of claim 33, wherein after the size of such content has been decreased in size, further including enabling a user to restore the size of such content.

38. The method of claim 33, further including displaying selected amounts of content communicated by each user within the user space corresponding to the orientation control associated with such user.

39. The method of claim 38, further including selecting the amount of content displayed as a function of distance between user spaces.

40. The method of claim 38, further including selecting the amount of content displayed as a function of orientation between user spaces.

41. The method of claim 38, further including selecting the amount of content displayed as a function of the reputation of each user.

42. The method of claim 41, further including automatically determining the reputation of each user.

43. The method of claim 38, further including selecting the amount of content displayed as a function of the time such content was communicated.

44. The method of claim 38, further including selecting the amount of content displayed as a function of the time such content was communicated and as a function of characteristics of such content.

45. The method of claim 33, further including displaying content communicated by each user in the user space corresponding to the orientation control associated with such user, and applying filtering criteria to select at least one user space.

46. The method of claim 45, wherein the filtering criteria include characteristics of such content.

47. The method of claim 45, wherein the filtering criteria include comparing selected comparison terms against the content of a user space.

48. The method of claim 45, wherein the filtering criteria include comparing selected comparison terms against metadata associated with a user space.

49. The method of claim 45, wherein the filtering criteria include the reputation of a user.

50. The method of claim 45, wherein the filtering criteria include at least one perception attribute associated with the content of a user space.

51. The method of claim 45, further including changing at least one perception attribute of a user space or of the content of a user space as a result of meeting the filtering criteria.

52. The method of claim 45, further including communicating a paging indicator based as a result of meeting the filtering criteria.

53. The method of claim 33, further including selectively suppressing display of at least one user space.

54. The method of claim 33, further including enabling a privacy mode whereby content of a user is communicated only to selected other users.

55. The method of claim 33, further including outputting a chronological interleaved transcript of content communicated among selected users.

56. The method of claim 33, further including displaying all communicated content only to at least one selected user, and enabling such at least one selected user to selectively communicate such content to selected other users.

57. The method of claim 33, wherein each orientation control is integrated with its corresponding user space.

58. The method of claim 33, further including enabling transfer of an object between user spaces.

59. The method of claim 33, further including enabling interaction between a user space and a kiosk.

60. A method of interactive communication between a plurality of users, including:
  (a) displaying a conversation display space having at least two dimensions;
  (b) displaying a plurality of user spaces within the conversation display space;
  (c) enabling a user to move or reorient an associated user space relative to at least one other user space within the conversation display space;
  (d) enabling communication of content between at least two user spaces; and
  (e) varying the size of user spaces as a function of distance between user spaces and at least one of: orientation between user spaces, the reputation of users, the time content was communicated, or the characteristics of such content.

61. The method of claim 60, wherein the conversation display space is user-centric.

62. The method of claim 60, further including enabling at least one user to add perception attributes to the user space associated with such user.

63. The method of claim 60, further including displaying content entered by a user in the user space associated with such user, and enabling such user to add perception attributes to at least some of such content.

64. The method of claim 60, further including varying the size of user spaces as a function of user centric orientation between user spaces.

65. The method of claim 60, further including varying the size of user spaces as a function of mutual orientation between user spaces.

66. The method of claim 60, further including automatically determining the reputation of each user.

67. The method of claim 60, further including varying the size of user spaces as a function of the time content was communicated.

68. The method of claim 60, further including varying the size of user spaces as a function of the time content was communicated and as a function of characteristics of such content.

69. The method of claim 60, wherein after a user space has been decreased in size, further including enabling a user to restore the size of such user space.

70. The method of claim 60, further including displaying selected amounts of content communicated by each user in the user space associated with such user.

71. The method of claim 70, further including selecting the amount of content displayed as a function of distance between user spaces.

72. The method of claim 70, further including selecting the amount of content displayed as a function of orientation between user spaces.

73. The method of claim 70, further including selecting the amount of content displayed as a function of the reputation of each user.

74. The method of claim 73, further including automatically determining the reputation of each user.

75. The method of claim 70, further including selecting the amount of content displayed as a function of the time such content was communicated.

76. The method of claim 70, further including selecting the amount of content displayed as a function of the time such content was communicated and as a function of characteristics of such content.

77. The method of claim 60, further including displaying content communicated by each user in the user space associated with such user, and applying filtering criteria to select at least one user space.

78. The method of claim 77, wherein the filtering criteria include characteristics of such content.

79. The method of claim 77, wherein the filtering criteria include comparing selected comparison terms against the content of a user space.

80. The method of claim 77, wherein the filtering criteria include comparing selected comparison terms against metadata associated with a user space.

81. The method of claim 77, wherein the filtering criteria include the reputation of a user.

82. The method of claim 77, wherein the filtering criteria include at least one perception attribute associated with the content of a user space.

83. The method of claim 77, further including changing at least one perception attribute of a user space or of the content of a user space as a result of meeting the filtering criteria.

84. The method of claim 77, further including communicating a paging indicator based as a result of meeting the filtering criteria.

85. The method of claim 60, further including enabling transfer of an object between user spaces.

86. The method of claim 60, further including enabling interaction between a user space and a kiosk.

87. The method of claim 86, wherein the interaction includes transfer of an object between the user space and the kiosk.

88. The method of claim 60, further including displaying a world view of the user spaces.

89. The method of claim 60, further including selectively suppressing display of at least one user space.

90. The method of claim 60, further including enabling a privacy mode whereby content of a user is communicated only to selected other users.

91. The method of claim 60, further including outputting a chronological interleaved transcript of content communicated among selected users.

92. The method of claim 60, further including displaying all communicated content only to at least one selected user, and enabling such at least one selected user to selectively communicate such content to selected other users.

93. A method of interactive communication between a plurality of users, including:
(a) displaying a conversation display space having at least two dimensions;
(b) displaying a plurality of user spaces within the conversation display space;
(c) enabling a user to move or reorient an associated user space relative to at least one other user space within the conversation display space;
(d) enabling communication of content between at least two user spaces; and
(e) displaying content communicated by each user in the user space associated with such user, and varying the size of the content of at least one user space as a function of distance between user spaces and at least one of: orientation between user spaces, the reputation of users, the time content was communicated, or the characteristics of such content.

94. The method of claim 93, further including varying the size of such content as a function of user centric orientation between user spaces.

95. The method of claim 93, further including varying the size of such content as a function of mutual orientation between user spaces.

96. The method of claim 93, further including automatically determining the reputation of each user.

97. The method of claim 93, further including displaying selected amounts of content communicated by each user in the user space associated with such user.

98. The method of claim 97, further including selecting the amount of content displayed as a function of distance between user spaces.

99. The method of claim 97, further including selecting the amount of content displayed as a function of orientation between user spaces.

100. The method of claim 97, further including selecting the amount of content displayed as a function of the reputation of each user.

101. The method of claim 100, further including automatically determining the reputation of each user.

102. The method of claim 97, further including selecting the amount of content displayed as a function of the time such content was communicated.

103. The method of claim 97, further including selecting the amount of content displayed as a function of the time such content was communicated and as a function of characteristics of such content.

104. The method of claim 93, further including displaying content communicated by each user in the user space associated with such user, and applying filtering criteria to select at least one user space.

105. The method of claim 104, wherein the filtering criteria include characteristics of such content.

106. The method of claim 104, wherein the filtering criteria include comparing selected comparison terms against the content of a user space.

107. The method of claim 104, wherein the filtering criteria include comparing selected comparison terms against metadata associated with a user space.

108. The method of claim 104, wherein the filtering criteria include the reputation of a user.

109. The method of claim 104, wherein the filtering criteria include at least one perception attribute associated with the content of a user space.

110. The method of claim 104, further including changing at least one perception attribute of a user space or of the content of a user space as a result of meeting the filtering criteria.

111. The method of claim 104, further including communicating a paging indicator based as a result of meeting the filtering criteria.

112. The method of claim 93, further including selectively suppressing display of at least one user space.

113. The method of claim 93, further including enabling a privacy mode whereby content of a user is communicated only to selected other users.

114. The method of claim 93, further including outputting a chronological interleaved transcript of content communicated among selected users.

115. The method of claim 93, further including displaying all communicated content only to at least one selected user, and enabling such at least one selected user to selectively communicate such content to selected other users.

116. The method of claim 93, further including enabling transfer of an object between user spaces.

117. The method of claim 93, further including enabling interaction between a user space and a kiosk.

118. A method of interactive communication between a plurality of users, including:
(a) displaying a conversation display universe;
(b) displaying, within the conversation display universe, a corresponding user space for each of a plurality of users;
(c) enabling each user to input content within the user space corresponding to such user, and communicating such content to the corresponding user space of at least one other user;
(d) for at least one user, displaying the content communicated by each other user within the user spate corresponding to each such other user; and
(e) selectively varying the size of such content as a function of distance between user spaces and at least one of: orientation between user spaces, the reputation of users, the time content was communicated, or the characteristics of such content.

119. The method of claim 118, further including varying the size of such content as a function of user centric orientation between user spaces.

120. The method of claim 118, further including varying the size of such content as a function of mutual orientation between user spaces.

121. The method of claim 118, further including automatically determining the reputation of each user.

122. A method of interactive communication between a plurality of users, including:
(a) displaying a conversation display universe;
(b) displaying, within the conversation display universe, a corresponding user space for each of a plurality of users;
(c) enabling each user to input content within the user space corresponding to such user, and communicating such content to the corresponding user space of at least one other user; and
(d) varying the size of the user spaces as a function of distance between user spaces and at least one of: orientation between user spaces, the reputation of users, the time content was communicated, or the characteristics of such content.

123. The method of claim 122, further including varying the size of user spaces as a function of user centric orientation between user spaces.

124. The method of claim 122, further including varying the size of user spaces as a function of mutual orientation between user spaces.

125. The method of claim 122, further including automatically determining the reputation of each user.

126. The method of claim 122, wherein after a user space has been decreased in size, further including enabling a user to restore the size of such user space.

* * * * *

UNITED STATES PATENT AND TRADEMARK OFFICE
CERTIFICATE OF CORRECTION

PATENT NO. : 7,124,372 B2
APPLICATION NO. : 10/171246
DATED : October 17, 2006
INVENTOR(S) : Glen David Brin It is certified that error appears in the above-identified patent and that said Letters Patent is hereby corrected as shown below:

In column 37, Line 18, Claim 118, "spate" should read --space--.

Signed and Sealed this

Tenth Day of April, 2007

JON W. DUDAS
*Director of the United States Patent and Trademark Office*